United States Patent
Okamura et al.

(10) Patent No.: US 7,287,515 B2
(45) Date of Patent: Oct. 30, 2007

(54) ENGINE FUEL CONTROL SYSTEM

(75) Inventors: Manabu Okamura, Yokohama (JP); Takashi Nakazawa, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/478,662

(22) Filed: Jul. 3, 2006

(65) Prior Publication Data

US 2007/0006851 A1    Jan. 11, 2007

(30) Foreign Application Priority Data

Jul. 5, 2005    (JP)    ............... 2005-196208

(51) Int. Cl.
*F02M 51/00*    (2006.01)

(52) U.S. Cl. .................. 123/494; 123/456; 701/104

(58) Field of Classification Search ............ 123/494, 123/456, 447, 467, 357, 436, 419; 73/119 A, 73/708; 701/104, 103, 105
See application file for complete search history.

(56) References Cited

U.S. PATENT DOCUMENTS

| | | | | |
|---|---|---|---|---|
| 5,657,736 A | * | 8/1997 | Maki et al. | ............. 123/673 |
| 5,924,281 A | * | 7/1999 | Yasui et al. | ............. 60/276 |
| 6,349,702 B1 | * | 2/2002 | Nishiyama | ............. 123/456 |
| 6,557,530 B1 | * | 5/2003 | Benson et al. | ............. 123/480 |
| 6,694,945 B2 | * | 2/2004 | Kawaguchi et al. | ......... 123/299 |
| 6,907,861 B2 | * | 6/2005 | Asano et al. | ............. 123/395 |
| 6,985,807 B2 | * | 1/2006 | Asano et al. | ............. 701/104 |
| 2004/0267433 A1 | * | 12/2004 | Asano et al. | ............. 701/104 |
| 2005/0049777 A1 | * | 3/2005 | Fritsch et al. | ............. 701/104 |
| 2005/0061297 A1 | * | 3/2005 | Oono | ............. 123/458 |

FOREIGN PATENT DOCUMENTS

JP    2000-320385    11/2000

* cited by examiner

*Primary Examiner*—Carl S. Miller
(74) *Attorney, Agent, or Firm*—Global IP Counselors, LLP

(57) ABSTRACT

A fuel control method and system is provided for delivering fuel to an engine that employs an engine controller that is configured to the fuel injection quantity delivered to the engine. The engine controller is configured to: calculate a fuel injection quantity based on at least one operating condition of an engine; calculate an estimated fuel pressure value of the high pressure fuel that will be acting on a fuel injection valve when the prescribed fuel injection timing is reached at a prescribed calculation time occurring before the prescribed fuel injection timing; correct the fuel injection quantity that was previously calculated to a corrected fuel injection quantity based on the estimated fuel pressure value that will exist at the prescribed fuel injection timing; and open the fuel injection valve at the prescribed fuel injection timing to discharge a quantity of fuel equal to the corrected fuel injection quantity.

22 Claims, 17 Drawing Sheets

ENGINE FUEL CONTROL SYSTEM

CROSS-REFERENCE TO RELATED APPLICATIONS

This application claims priority under 35 U.S.C. § 119 to Japanese Patent Application No. 2005-196208. The entire disclosure of Japanese Patent Application No. 2005-196208 is hereby incorporated herein by reference.

BACKGROUND OF THE INVENTION

1. Field of the Invention

The present invention relates to an engine fuel control system. More particularly, the present invention relates to a fuel control system for an engine in which fuel is supplied to a fuel injection valve using a high pressure fuel pump that is driven by the engine.

2. Background Information

A fuel control system is disclosed in Japanese Laid-Open Patent Publication No. 2000-320385 that is used for an engine equipped with an actuator driven by a crankshaft, a high pressure fuel pump driven by the actuator to discharge high-pressure fuel, and a fuel injection valve configured to open at a prescribed fuel injection timing and deliver high-pressure fuel from the high pressure fuel pump to the engine. The fuel control system disclosed in Japanese Laid-Open Patent Publication No. 2000-320385 is configured to detect the fuel pressure at a point in time before fuel injection into a given cylinder and calculate a fuel injection time for that cylinder in the next cycle (one cycle later) using the detected pressure as an estimate value of the fuel pressure that will exist for that cylinder in the next cycle.

In view of the above, it will be apparent to those skilled in the art from this disclosure that there exists a need for an improved engine fuel control system. This invention addresses this need in the art as well as other needs, which will become apparent to those skilled in the art from this disclosure.

SUMMARY OF THE INVENTION

One object of the present invention is to provide an engine fuel delivery method and an engine fuel control system that are provided with an injection timing calculation timing occurring before the fuel injection timing but are nevertheless capable of delivering a fuel injection quantity that is appropriate (not too large) at the actual fuel injection timing.

One aspect of the present invention applies to an engine fuel control system in accordance with the present invention basically includes a high pressure fuel pump, at least one fuel injection valve and a controller. The high pressure fuel pump is arranged to discharge high pressure fuel. The fuel injection valve is configured and arranged to open at a prescribed fuel injection timing and inject high-pressure fuel from the high pressure fuel pump. The controller operatively is coupled to the fuel injection valve. The controller basically includes a fuel injection quantity calculating section, a fuel pressure estimate value calculating section, a fuel injection quantity correcting section and a fuel injection valve operating section. The fuel injection quantity calculating section is configured to calculate a fuel injection quantity based on at least one operating condition of the engine. The fuel pressure estimate value calculating section is configured to execute a calculation at a prescribed calculation time occurring before the prescribed fuel injection timing with the calculation estimating an estimated fuel pressure value of the high pressure fuel that will be acting on the fuel injection valve. The fuel injection quantity correcting section is configured to correct the fuel injection quantity that was previously calculated to a corrected fuel injection quantity based on the estimated fuel pressure value that will exist at the fuel injection timing. The fuel injection valve operating section is configured to open the fuel injection valve at the prescribed fuel injection timing to discharge a quantity of fuel equal to the corrected fuel injection quantity.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
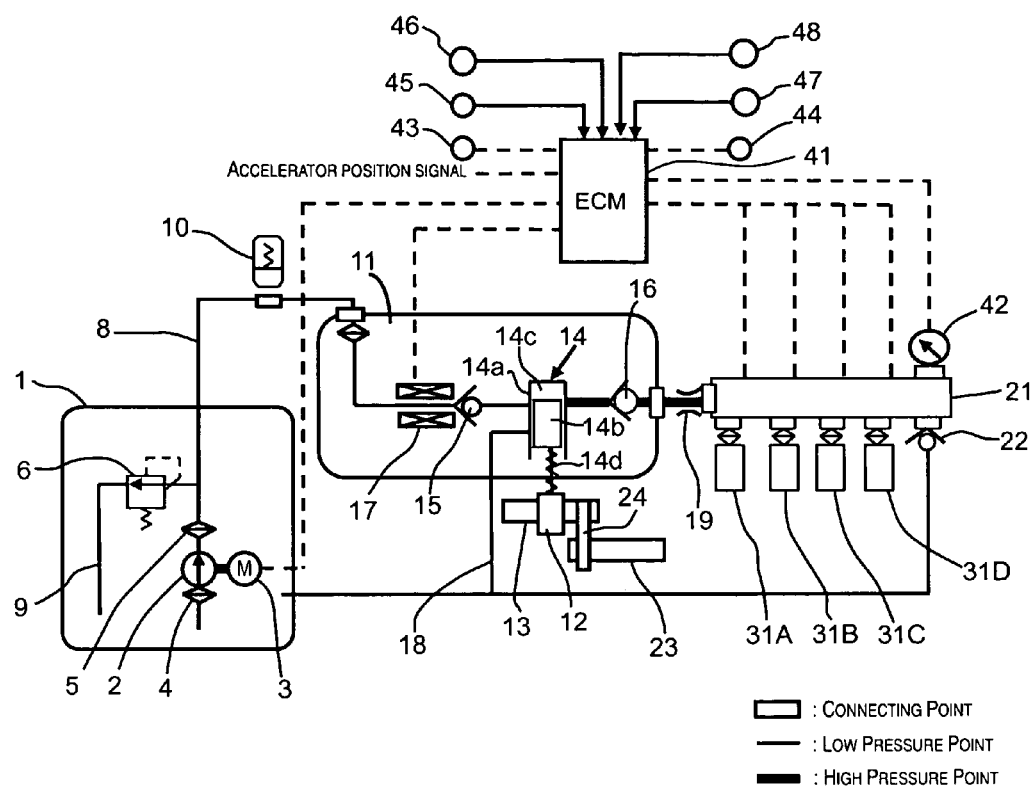
FIG. 1 is a schematic view of a fuel control system in accordance with a first embodiment of the present invention.
Figure 2:
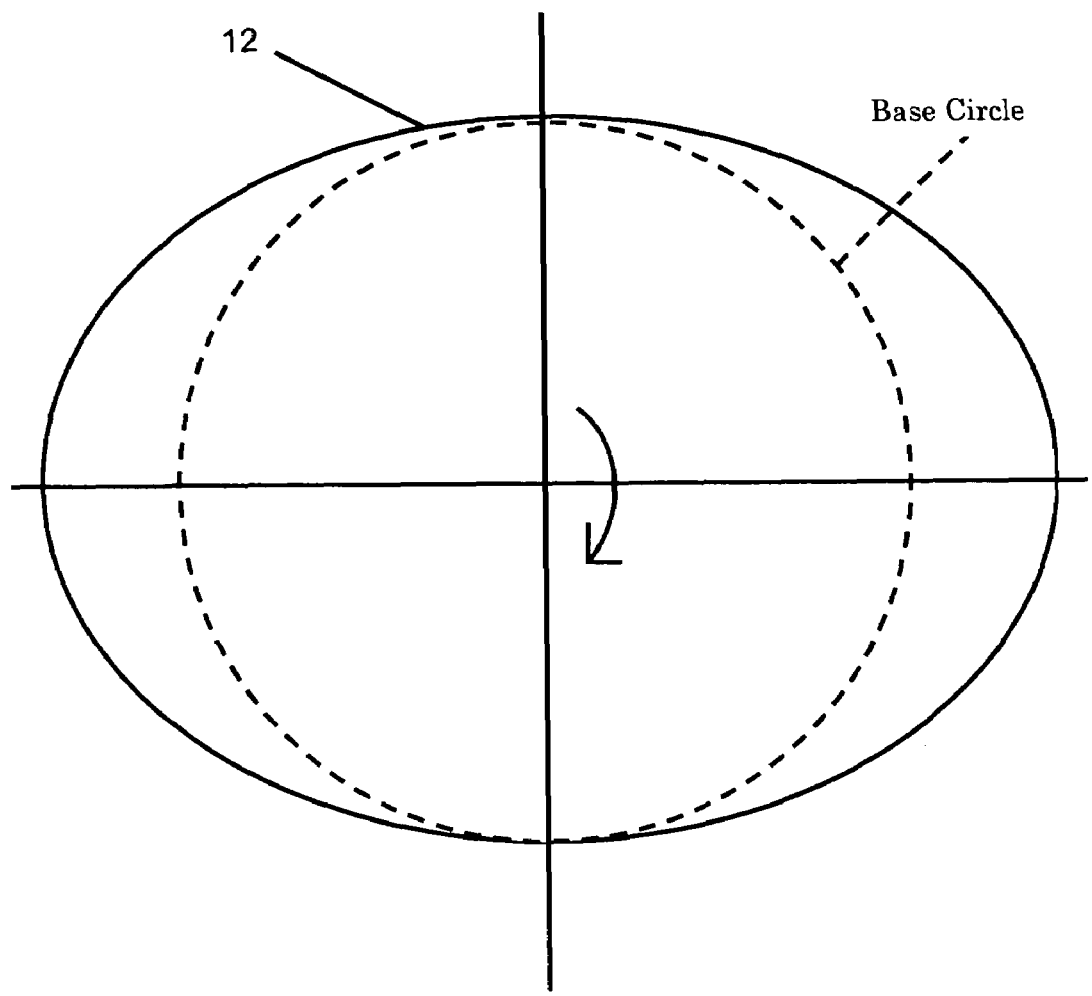
FIG. 2 is a plan view of a pump drive cam.
Figure 3:
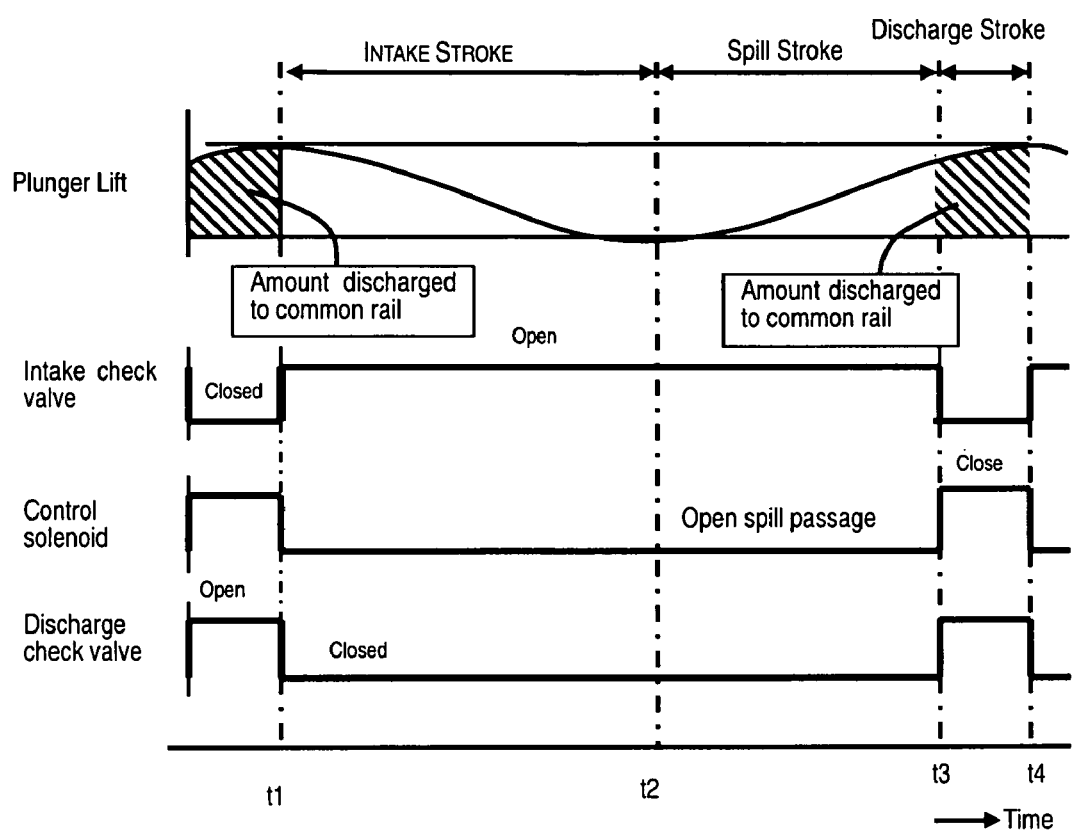
FIG. 3 is a diagram of wave forms for explaining the operation of a high pressure fuel pump.

Referring initially to FIG. 1, an engine fuel control system is schematically illustrated in accordance with a first embodiment of the present invention. The engine fuel control system shown in FIG. 1 basically comprises a fuel tank 1, a feed pump 2, a high pressure fuel pump 11, a common rail (fuel gallery) 21, and fuel injection valves. FIG. 2 is a plan view of a pump drive cam 12 (plate cam), while FIG. 3 is a waveform diagram illustrating the operation of the high pressure fuel pump 11.

The feed pump 2 is driven with an electric motor 3 and serves to pump fuel from the inside of the fuel tank 1 to a fuel supply passage 8. A fuel filter 4 is provided on the upstream side of the feed pump 2 and a fuel filter 5 is provided on the downstream side of the feed pump 2. In order to prevent the discharge pressure of the feed pump 2 from exceeding a prescribed pressure, a return passage 9 is configured and arranged to branch from the fuel supply passage 8 and return to the fuel tank 1 and a low-pressure pressure regulator 6 is installed inside the return passage 9.

The fuel discharged from the feed pump 2 passes through the fuel supply passage 8 and arrives at the high pressure fuel pump 11. A damper 10 is provided in the fuel supply passage 8 in order to suppress fuel pressure pulsations.

The constituent features of the high pressure fuel pump 11 of the present invention will now be described. The high pressure fuel pump 11 basically comprises a pump drive cam 12 (plate cam) serving as an actuator that is driven by a crankshaft 23 of the engine, a plunger pump 14 driven by the pump drive cam 12, a normally closed intake check valve 15, a normally closed discharge check valve 16, and a control solenoid 17. The plunger pump 14 basically comprises a cylinder 14a, one plunger 14b configured and arranged to move reciprocally up and down (when viewed as shown in FIG. 1) in response to the movement of the peripheral cam surface of the pump drive cam 12, a high pressure chamber 14c defined by the cylinder 14a and the plunger 14b, a spring 14d configured to spring load the plunger 14b toward the cam surface of the cam 12, and a spill passage 18 configured and arranged to return fuel from the high pressure chamber 14c to the fuel tank 1.

The pump drive cam 12 comprises two lift portions that bulge out from the base circle at left and right positions that are 180° away from each other, as shown in FIG. 2. Assuming the pump drive cam 12 is rotated clockwise when viewed as shown in FIG. 2, when the plunger descends toward the base circle from either of the left and right maximum lift positions shown in FIG. 2, the spring 14d forces the plunger 14b toward the cam 12 and causes the plunger 14b to move downward (i.e., downward from the perspective of FIG. 1). As the pump drive cam 12 rotates further away from the base circle toward a position where the opposite maximum lift position (separated from the first maximum lift position by 180°) is in contact with the plunger 14b, the plunger 14b moves upward (i.e., upward from the perspective of FIG. 1) against the spring force of the spring 14d.

FIG. 3 shows a model of the operation of the high pressure fuel pump 11. The intake check valve 15 is opened at the time t1 when the plunger 14b is at the highest lift position, and low pressure fuel from the feed pump 2 is drawn into the high pressure chamber 14c as the plunger 14b falls from the highest lift position to the lowest lift position, which the plunger 14b reaches at the time t2. In short, the period from the time t1 to the time t2 corresponds to the intake stroke of the high pressure fuel pump 11.

Starting from the time t2, the plunger 14b rises toward the highest lift position and the control solenoid 17 opens the spill passage 18. As a result, the fuel in the high pressure chamber 14c returns to the fuel tank 1 through the spill passage 18 and is not pumped to the common rail 21.

While the plunger continues to rise, the control solenoid 17 closes the spill passage 18 at a time t3. During the period from the time t3 to the time t4 when the plunger 14b reaches the highest lift position, the fuel pressure inside the high pressure chamber 14c rises and the discharge check valve 16 opens to allow high-pressure fuel to pass through an orifice 19 and into the common rail 21. In short, the period from the time t2 to the time t3 corresponds to the spill stroke of the high pressure fuel pump 11 and the period from t3 to t4 corresponds to the discharge stroke of the high pressure fuel pump 11. Also, the period from t1 to t4 corresponds to one cycle of operation and, after the time t4, the same cycle of operation is repeated.

The earlier the timing at which the control solenoid 17 closes the spill passage 18 (i.e., the earlier the timing of the time t3), the larger the quantity of fuel discharged from the high pressure fuel pump 11 will be. Conversely, the later the timing at which the control solenoid 17 closes the spill passage 18 (i.e., the later the timing of the time t3), the smaller the quantity of fuel discharged from the high pressure fuel pump 11 will be. Thus, the discharge quantity of the high pressure fuel pump 11 can be controlled by advancing and retarding the timing at which the control solenoid 17 closes the spill passage 18.

Returning to FIG. 1, the pump drive cam 12 is provided as an integral part of the intake valve camshaft 13 of the engine. A cam sprocket fixed to the frontward end of the intake valve camshaft 13 and a crank sprocket fixed to the frontward end of the crankshaft 23 are joined with a chain or belt 24 such that the intake valve camshaft 13 is driven indirectly by the crankshaft 23.

A safety valve 22 is provided on the rearward end of the common rail 21. When the actual common rail fuel pressure exceeds an allowable pressure, the safety valve 22 opens and allows a portion of the high-pressure fuel inside the common rail 21 return to the fuel tank 1.

The high-pressure fuel stored in the common rail 21 is distributed to the high pressure fuel injection valve of each cylinder. FIG. 1 illustrates a case in which the engine has four cylinders and high-pressure fuel stored in the common rail 21 acts on four high pressure fuel injection valves 31A, 31B, 31C, and 31D.

Fuel is injected into the combustion chambers of the cylinders by opening each fuel injection valve 31A to 31D at a prescribed fuel injection timing in accordance with the ignition timing of the respective cylinder to which the fuel injection valve belongs. For example, assume that the fuel injection valve 31A belongs to the first cylinder, the fuel injection valve 31B belongs to the second cylinder, the fuel injection valve 31C belongs to the third cylinder, and the fuel injection valve 31D belongs to the fourth cylinder and that the firing order is 1-3-4-2. In such a case, the fuel injection valves will be opened in the order 31A, 31C, 31D, and 31B, each at a prescribed fuel injection timing. When a prescribed quantity of fuel has been lost through the fuel injection valves 31A to 31D, the common rail fuel pressure decreases.

An engine controller 41 is provided for controlling the injection of fuel by the engine fuel control system. Thus, the engine controller 41 is operatively coupled to the high pressure fuel pump 11 and the fuel injection valves 31A, 31B, 31C, and 31D as well as other parts. The engine controller 41 preferably includes a microcomputer with a fuel injection control program that controls the high pressure fuel pump 11 and the fuel injection valves 31A, 31B, 31C, and 31D as well as other parts, as discussed below. The engine controller 41 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the engine controller 41 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The engine controller 41 has a map prepared in advance that plots a target fuel pressure of the common rail 21 with respect to the engine load and the engine speed. The engine controller 41 controls the control solenoid 17, and thereby controls the discharge quantity of the high pressure fuel pump 11, such that the actual common rail fuel pressure detected by a fuel pressure sensor 42 matches the target fuel pressure corresponding to the engine load and engine speed existing at that point in time. For example, if the actual common rail fuel pressure is lower than the target fuel pressure, the engine controller 41 advances the timing at which the control solenoid 17 closes the spill passage 18, thereby increasing the discharge quantity of the high pressure fuel pump 11 and raising the actual common rail fuel pressure to a value near the target fuel pressure. Conversely, if the actual common rail fuel pressure is higher than the target fuel pressure, the engine controller 41 retards the timing at which the control solenoid 17 closes the spill passage 18, thereby decreasing the discharge quantity of the high pressure fuel pump 11 and lowering the actual common rail fuel pressure to a value near the target fuel pressure.

The engine controller 41 also calculates a base injection pulse width Tp based on the engine speed Ne (rotational speed of the crankshaft 23) detected by an engine rotational speed 48 and an intake air quantity Qa detected by an air flow sensor 46 and calculates a fuel pressure compensation coefficient KINJ based on the actual common rail fuel pressure detected by the fuel pressure sensor 42. The engine controller 41 then multiplies the base injection pulse width Tp by the fuel pressure compensation coefficient KINJ (thereby correcting the base injection pulse width Tp) so as to calculate a fuel injection pulse width Ti for controlling the fuel injection valves. When the respective prescribed fuel injection timing of each cylinder is reached, the respective fuel injection valve 31A to 31D is opened for a duration equal to the fuel injection pulse width Ti.

Figure 11:
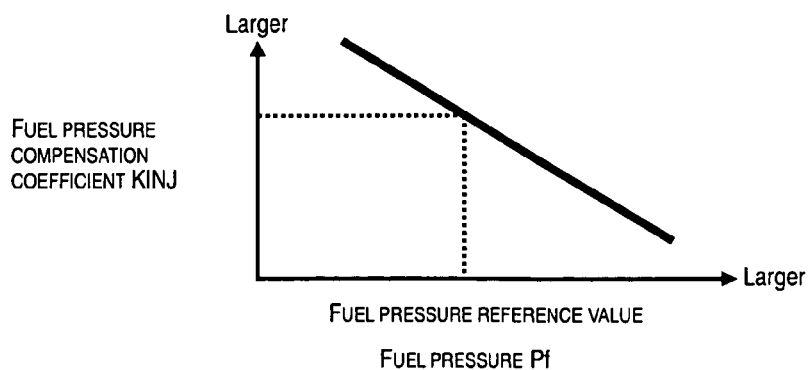
FIG. 11 is a characteristic diagram of the fuel pressure compensation coefficient.

The fuel pressure compensation coefficient KINJ is given as shown in FIG. 11. The value of the fuel pressure compensation coefficient KINJ is 1.0 when the common rail fuel pressure is at a common rail fuel pressure reference value, smaller than 1.0 when the actual common rail fuel pressure is higher than the common rail fuel pressure reference value, and larger than 1.0 when the actual common rail fuel pressure is lower than the common rail fuel pressure reference value.

The reason the fuel pressure compensation coefficient KINJ is set to be a positive value larger than 1.0 when the actual common rail fuel pressure is higher than the common rail fuel pressure reference value will not be explained. Assuming the base injection pulse Tp is fixed, the fuel injection quantity increases as the common rail fuel pressure increases. Similarly, assuming the common rail fuel pressure is fixed, the fuel injection quantity increases as the base injection pulse width Tp increases. If the base injection pulse width Tp is determined such that the required quantity of fuel will be delivered when the common rail fuel pressure equals the common rail fuel pressure reference value, then, when the actual common rail pressure is higher than the common rail fuel pressure reference value, using the same base injection pulse width Tp will cause the amount of fuel delivered to be too large by an amount corresponding to the amount by which the actual fuel pressure exceeds the reference value. Therefore, when the actual common rail fuel pressure is higher than the common rail fuel pressure reference value, the fuel pressure compensation coefficient KINJ is set to a positive value smaller than 1.0 so as to correct the base injection pulse width Tp to a smaller value. As a result, the quantity of fuel delivered does not exceed the required fuel quantity even though the actual common rail fuel pressure is higher than the common rail fuel pressure reference value.

Similarly, the reason the fuel pressure compensation coefficient KINJ is set to a positive value larger than 1.0 when the actual common rail fuel pressure is lower than the common rail fuel pressure reference value is to ensure that the quantity of fuel delivered is not less than the required fuel quantity even when the actual common rail fuel pressure is lower than the common rail fuel pressure reference value.

In this embodiment, the high-pressure fuel valves 31A to 31D are arranged to face into the combustion chambers of the respective cylinders and configured to execute compression stroke injection into the cylinders when the engine is started in order to accomplish stratified combustion.

Assuming the injection end timing is fixed, the injection start timing (fuel injection timing) is determined as a crankshaft position that occurs in advance of the crankshaft position corresponding to the injection end timing. The angular distance by which the injection start timing precedes the injection end timing is calculated based on the engine speed at that particular time and a prescribed fuel injection pulse width Ti ($=Tp \times KINJ$) corresponding to the required fuel quantity. Therefore, the injection start timing is calculated at a predetermined injection timing calculation timing occurring before the actual fuel injection timing. Consequently, a time difference exists between the injection timing calculation timing and the actual fuel injection timing.

Since a time difference exists between the injection timing calculation timing and the actual fuel injection timing, a degree of error exists in the calculation of the injection start timing and there are times when the quantity of fuel delivered is to large, causing the exhaust emissions and fuel economy to become degraded.

Figure 4:
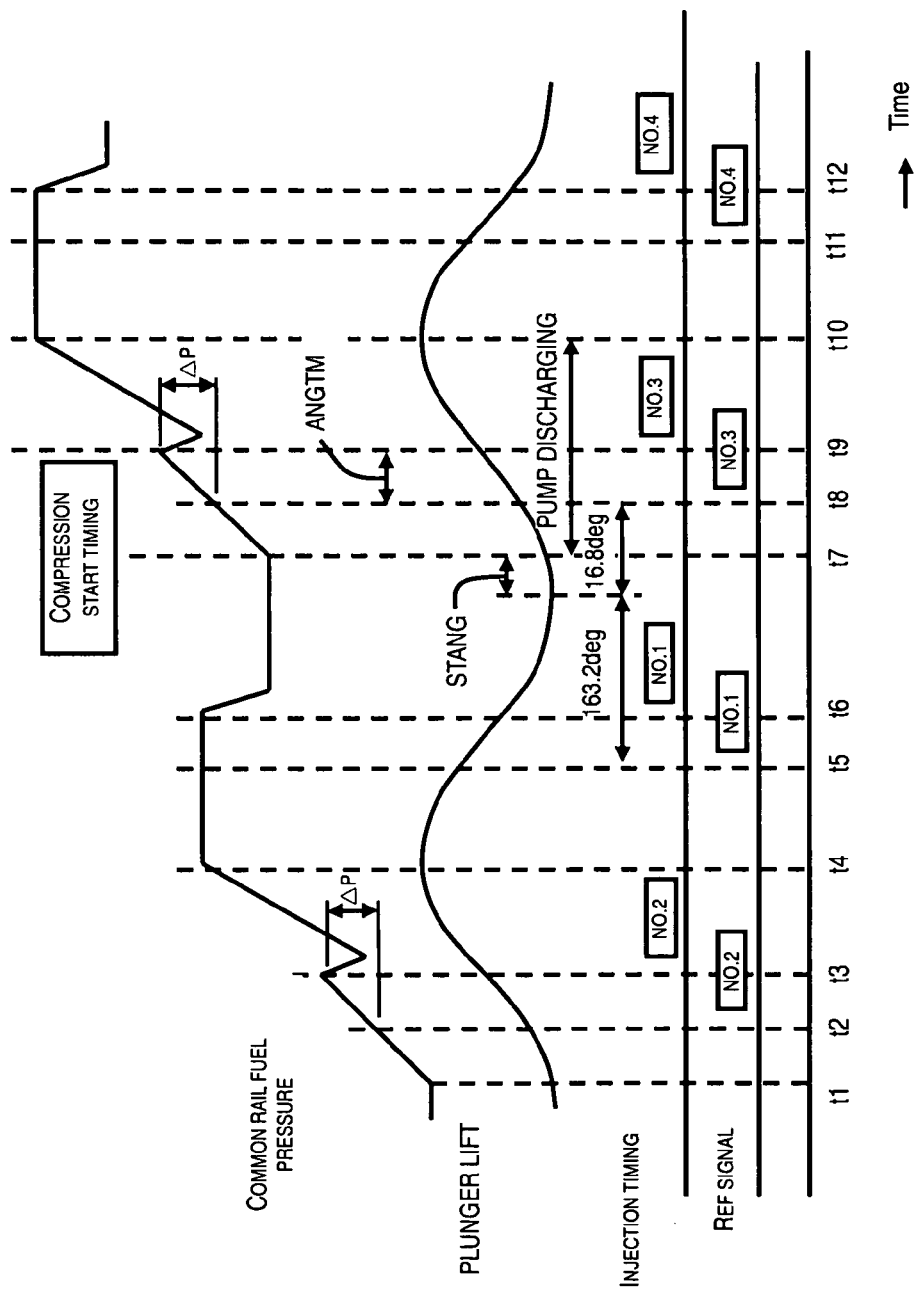
FIG. 4 is a diagram of wave forms for explaining the operation of the present invention.

The effects of this time difference will now be explained with reference to FIG. 4. The uppermost curve in FIG. 4 shows a model of the manner in which the fuel pressure in the common rail changes immediately after the engine is cranked. As indicated by the uppermost curve of FIG. 4, when cranking starts, the high pressure fuel pump 11 begins to operate and the fuel pressure at the common rail begins to increase from a point in time t1. The fuel pressure continues to rise until a time t3, at which time the fuel is injected into the second cylinder during the compression stroke thereof (compression stroke fuel injection). The fuel pressure at the common rail decreases slightly due to the compression stroke fuel injection of the second cylinder but rises again until a time t4. After the time t4, the fuel pressure at the common rail becomes constant until a time t6 when a compression stroke fuel injection is executed at the first cylinder. The common rail fuel pressure decreases slightly due to the compression stroke fuel injection of the first cylinder and then stabilizes again at a constant pressure.

Starting at a time t7, the common rail fuel pressure rises again until a time t9 when the compression stroke fuel injection of the third cylinder occurs. The common rail fuel pressure decreases slightly due to the compression stroke fuel injection of the third cylinder but rises again until a time t10. After the time t10, the fuel pressure at the common rail becomes constant until a time t12 when a compression stroke fuel injection is executed at the fourth cylinder. The common rail fuel pressure decreases slightly due to the compression stroke fuel injection of the fourth cylinder and then stabilizes again at a constant pressure.

Now, comparing the change in the common rail fuel pressure to the change in the plunger lift of the high pressure fuel pump 11 indicated by the second curve in FIG. 4, the periods from t1 to t4 and from t7 to t10 are periods during which the plunger lift is increasing (pump plunger 14b is rising) and the periods from t4 to t7 and from t10 onward (to a time not shown in the figure) are periods during which the plunger lift is decreasing (pump plunger 14b is falling).

In this embodiment, the timing at which the Ref signal of each cylinder begins to rise is used as the fuel injection start timing calculation timing. The Ref signal is well known as a signal indicating the crankshaft reference position of each cylinder.

For the first cylinder, the injection start timing is calculated at an injection start timing calculation timing occurring at the time t5 and the calculation is based on the actual common rail fuel pressure measured at the time t5. When the fuel injection timing (t6) of the first cylinder is reached immediately thereafter, the common rail fuel pressure is still the same as it was at the time t5. Consequently, even though the injection start timing of the first cylinder is calculated in advance at the time t5 and the calculated fuel injection timing occurs at a later time t6, there is no error in the calculation of the injection start timing because the fuel pressure remains constant. Similarly, the injection start timing of the fourth cylinder is calculated at an injection start timing calculation timing occurring at a time t11 and the calculation is based on the actual common rail fuel pressure measured at the time t11. When the fuel injection timing (t12) of the fourth cylinder is reached immediately thereafter, the common rail fuel pressure is still the same as it was at the time t11. Consequently, even though the injection start timing of the fourth cylinder is calculated in advance at the time t11 and the calculated fuel injection timing occurs at a later time t12, there is no error in the calculation of the injection start timing because the fuel pressure remains constant.

Conversely, in the case of the second cylinder, the injection start timing calculation timing (t2) and the fuel injection timing (t3) occur while the plunger lift is increasing during the period from t1 to t4. If the injection start timing were calculated at an injection start timing calculation timing that occurs at the time t2 and the calculation were based on the common rail fuel pressure measured at the time t2, a degree of error would exists in the calculation of the injection start timing of the second cylinder because the common rail fuel pressure rises by an amount ΔP during the period from the time t2 to the fuel injection timing at the time t3. As a result, the amount of fuel delivered to the second cylinder would be too large. Similarly, in the case of the third cylinder, the injection start timing calculation timing (t8) and the fuel injection timing (t9) occur while the plunger lift is increasing during the rising pump plunger stroke from t7 to t10. If the injection start timing were calculated at an injection start timing calculation timing that occurs at the time t8 and the calculation were based on the common rail fuel pressure measured at the time t8, a degree of error would exist in the calculation of the injection start timing of the third cylinder because the common rail fuel pressure rises by an amount ΔP during the period from the time t8 to the fuel injection timing occurring at the time t9. As a result, the amount of fuel delivered to the third cylinder would be too large.

Figure 5:
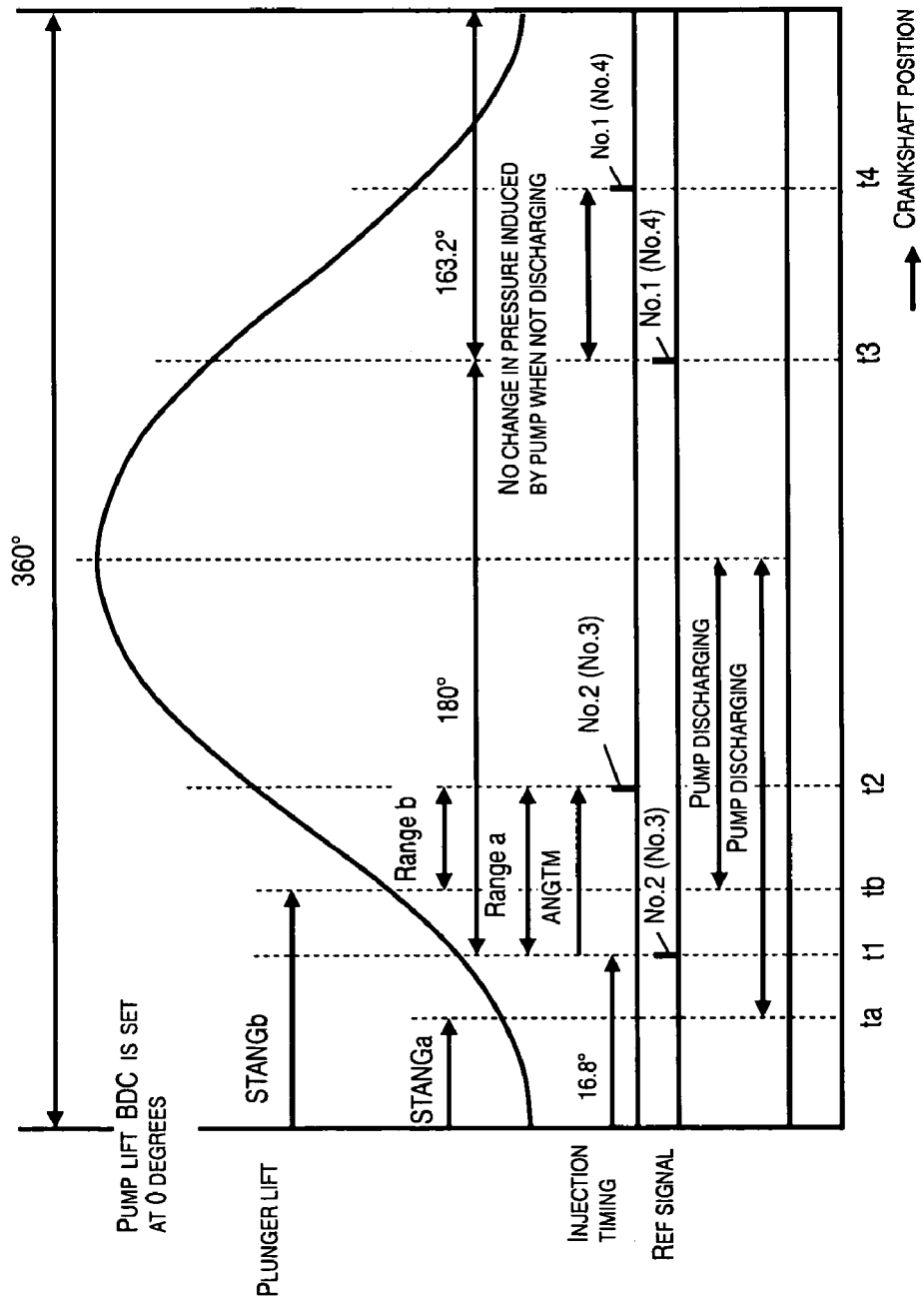
FIG. 5 is a diagram of wave forms for explaining the operation of the present invention.

This situation will now be explained further with reference to FIG. 5. FIG. 5 is a plot of the plunger lift of the plunger pump 14 versus the crankshaft position (rotational angle of the crankshaft 23), the crankshaft position being indicated on the horizontal axis. Since the intake valve camshaft 13 rotates once every two revolutions of the crankshaft 23 and the pump drive cam 12 lifts the plunger twice per single revolution of the camshaft 13, one cycle of plunger lift corresponds precisely to 360° of rotation of the crankshaft 23. For the purposes of this explanation, it is assumed that the Ref signal of the first cylinder is issued at a time t3 occurring 163.2° prior to arrival at the right-hand end of the plot (i.e., prior to completion of 360° of rotation of the crankshaft 23), where the crankshaft position corresponding to zero plunger lift of the plunger pump 14 occurs at the left-hand end or right-hand end of the plot. If the firing order of the four-cylinder engine is 1-3-4-2, then the cylinder that fires immediately prior to the first cylinder is the second cylinder and the Ref signal of the second cylinder is issued at a time t1 occurring 180° prior to the issuance of the Ref signal of the first cylinder in terms of the crankshaft position.

Meanwhile, the fuel injection timing of the first cylinder comes at a time (crankshaft position) t4 occurring after the issuance (at t3) of the Ref signal of the first cylinder, and the fuel injection timing of the second cylinder comes at a time (crankshaft position) t2 occurring after the issuance (at t1) of the Ref signal of the second cylinder.

The respective Ref signal issuances and fuel injection timings of the third and fourth cylinders occur at crankshaft positions that are 360° in advance of the crankshaft positions where the Ref signal issuances and fuel injection timings of the second and first cylinders, respectively, occur. In other words, the Ref signal issuance and fuel injection timing of the third cylinder occur at the same crankshaft positions as the Ref signal issuance and fuel injection timing of the second cylinder. Likewise, the Ref signal issuance and fuel injection timing of the fourth cylinder occur at the same crankshaft positions as the Ref signal issuance and fuel injection timing of the first cylinder. Therefore, the timings of the Ref signal issuance and fuel injection of the third cylinder and the fourth cylinder are indicated with "No. 3" and "No. 4" in parentheses in FIG. 5.

For the second cylinder and the third cylinder, the timing of the issuance of the Ref signal and the fuel injection timing both occur when the plunger lift is increasing. Consequently, the common rail fuel pressure at the fuel injection timing (t2)

of the second and third cylinders is larger than the common rail fuel pressure at the timing (t1) of the issuance of the Ref signals of the second and third cylinders by an amount in accordance with the timing difference between t1 and t2. Consequently, if the fuel pressure compensation coefficient KINJ is calculated based on the common rail fuel pressure at the timing t1, a fuel injection pulse width Ti for controlling the fuel injection valves 31B and 31C of the second cylinder and third cylinder is calculated by multiplying the base injection pulse width Tp by the fuel pressure compensation coefficient KINJ, and the fuel injection start timing of the second and third cylinders is calculated based on the fuel injection pulse width Ti and the engine speed, then the fuel injection quantity of the second and third cylinders will be too large by an amount in accordance with the amount $\Delta P$ by which the common rail fuel pressure rises during the period between the injection start timing calculation timing of the second and third cylinders and the fuel injection timing of the second and third cylinders. As a result, the fuel economy will degrade.

With the present invention, however, at the injection start timing calculation timing of the second and third cylinders (i.e., the cylinders for which the timing of the issuance of the Ref signal and the fuel injection timing occur while the plunger lift is increasing), the amount $\Delta P$ by which the common rail fuel pressure will rise during the period from the injection start timing calculation timing (i.e., the timing of the issuance of the Ref signal) to the fuel injection timing of the second and third cylinders is calculated and added to the actual common rail fuel pressure Pf at the injection start timing calculation timing (or a weighted average value AVEPF thereof) so as to calculate a common rail fuel pressure estimate value PFUEL_Y that estimates the common rail fuel pressure that will exist at the fuel injection timing. Then, a fuel pressure compensation coefficient KINJ2-3 for the second and third cylinders is calculated based on the common rail fuel pressure estimate value PFUEL_Y and the fuel pressure compensation coefficient KINJ2-3 is multiplied by the base injection pulse width Tp to calculate a fuel injection pulse width Ti2-3 for the second and third cylinders. Finally, the injection start timing ITst2-3 of the second and third cylinders is calculated based on the calculated fuel injection pulse width Ti2-3 and the engine speed Ne at that time.

Meanwhile, for the first cylinder and the fourth cylinder, the timing of the issuance of the Ref signal and the fuel injection timing both occur when the plunger lift is decreasing. Consequently, the common rail fuel pressure at the fuel injection timing (t4) of the first and fourth cylinders is the same as the common rail fuel pressure at the timing (t3) of the issuance of the Ref signals of the first and fourth cylinders. Consequently, for the first cylinder and the fourth cylinder, even if the fuel pressure compensation coefficient KINJ is calculated based on the common rail fuel pressure detected at the timing t3 and the fuel injection pulse width Ti that determines the timing t4 is calculated using the fuel pressure compensation coefficient KINJ, the fuel injection quantity will be accurate because there is no increase $\Delta P$ in the common rail fuel pressure during the period from the injection start timing calculation timing to the fuel injection timing.

Therefore, the present invention is contrived not to execute a compensation for an increase $\Delta P$ in the common rail fuel pressure when calculating the fuel injection start timing (fuel injection pulse width Ti) of the cylinders for which the Ref signal issuance timing and the fuel injection timing occur while the plunge lift is decreasing. In short, the fuel injection start timing of the first and fourth cylinders is calculated in the same manner as it is calculated in conventional systems.

The control operations executed by the engine controller 41 in order to accomplish the fuel injection control described heretofore will now be explained in detail with reference to flowcharts.

Figure 6:
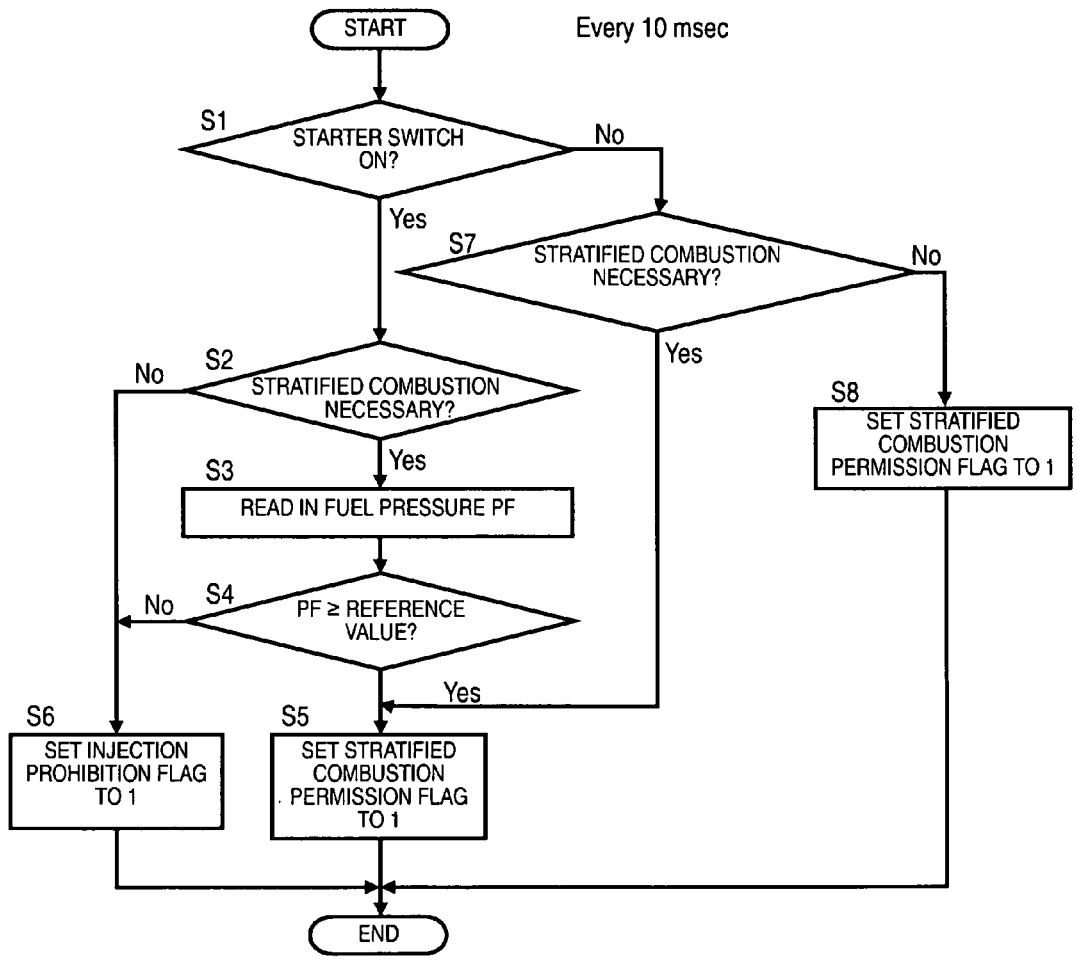
FIG. 6 is a diagram of wave forms for explaining how the stratified combustion permission flag is set.

FIG. 6 shows a control sequence that is executed once per prescribed period of time (e.g., every 10 msec) in order to set a stratified combustion permission flag.

In step S1, the engine controller 41 checks the signal from the starter switch 45. If the signal from the starter switch 45 is ON, the engine controller 41 determines that the engine is being started and proceeds to step S2, where it determines if there is a need for stratified combustion. The operating state of the engine is determined by the engine speed and the engine load and there are two main operating regions of operating states: a stratified combustion region where the load is low and stratified combustion is conducted and a homogeneous combustion region where the load is high and homogenous combustion is conducted. When the load is low and a large engine output is not required, the fuel economy can be improved by injecting the fuel during the compression stroke and conducting stratified combustion. Conversely, when the load is high and a large engine output is required, the engine changes the combustion state from stratified combustion to so-called homogeneous combustion by injecting the fuel during the intake stroke so that thorough vaporization of the fuel is promoted throughout the entire combustion chamber before the fuel is combusted. Thus, the engine controller 41 determines that there is a need for stratified combustion if the engine operating state determined by the engine speed and the engine load lies in the stratified combustion region. Conversely, the engine controller 41 determines that there is not a need for stratified combustion when the engine operating state determined by the engine speed and the engine load lies in the homogeneous combustion region.

In this embodiment, the engine controller 41 also conducts stratified combustion by injecting the fuel during the compression stroke during engine cranking when the starter switch 45 is ON. Therefore, when the starter switch 45 is ON, the engine controller 41 determines that there is a need for stratified combustion and proceeds to steps S3 and S4. In step S3 the engine controller 41 detects the actual common rail fuel pressure Pf with the common rail fuel pressure sensor 42, and in step S4 the engine controller 41 compares the detected actual common rail fuel pressure Pf with a reference value.

The reference value is the stratified combustion permission fuel pressure (i.e., the common rail fuel pressure above which stratified combustion is permitted). The quantity of fuel delivered from a fuel injection valve to one cylinder during any single cycle is determined by the common rail fuel pressure and the fuel injection pulse width. The minimum fuel quantity required to rotate the crankshaft 23 of the engine in a stable manner with stratified combustion and the minimum fuel injection pulse width for which the opening precision of the fuel injection valve can be ensured are determined in advance. Thus, the minimum value of the common rail fuel pressure required to rotate the crankshaft 23 of the engine in a stable manner using stratified combustion is determined based on this minimum fuel quantity and minimum fuel injection pulse width. The aforementioned reference value is this minimum value of the common rail fuel pressure required to rotate the crankshaft 23 of the engine in a stable manner using stratified combustion. More particularly, the reference value is set to approximately 2 MPa. If the actual common rail fuel pressure Pf is equal to or above the reference value, the engine controller 41 determines that the common rail fuel pressure is sufficient to conduct stratified combustion and proceeds to step S5, where it sets the value of the stratified combustion permission flag to 1 (the default value of the stratified combustion permission flag being 0).

Conversely, if in step S4 the actual common rail fuel pressure Pf is found to be smaller than the reference value, the engine controller 41 determines that the common rail fuel pressure is not sufficient to conduct stratified combustion and proceeds to step S6, where it sets the value of an injection prohibition flag to 1 (the default value of the injection prohibition flag being 0).

Meanwhile, if the engine controller 41 determines in step S2 that there is not a need for stratified combustion, it proceeds to step S6 and sets the value of the injection prohibition flag to 1.

If it determines in step S1 that the starter switch 45 is OFF (the ignition switch is assumed to be ON), then the engine controller 41 proceeds to steps S7 and S8. Steps S7 and S8 are control steps that apply after the engine has been started. In step S7, the engine controller 41 determines if there is a need for stratified combustion. In the same manner as explained previously, the engine controller 41 determines that there is a need for stratified combustion when the engine operating state determined by the engine speed and the engine load lies in the stratified combustion region. Conversely, the engine controller 41 determines that there is not a need for stratified combustion when the engine operating state determined by the engine speed and the engine load lies in the homogeneous combustion region. If it determines that there is a need for stratified combustion, the engine controller 41 proceeds to step S5 and sets the stratified combustion permission flag to 1. If it determines that there is not a need for stratified combustion, the engine controller 41 proceeds to step S8 and sets the stratified combustion permission flag to 0.

Figure 7:
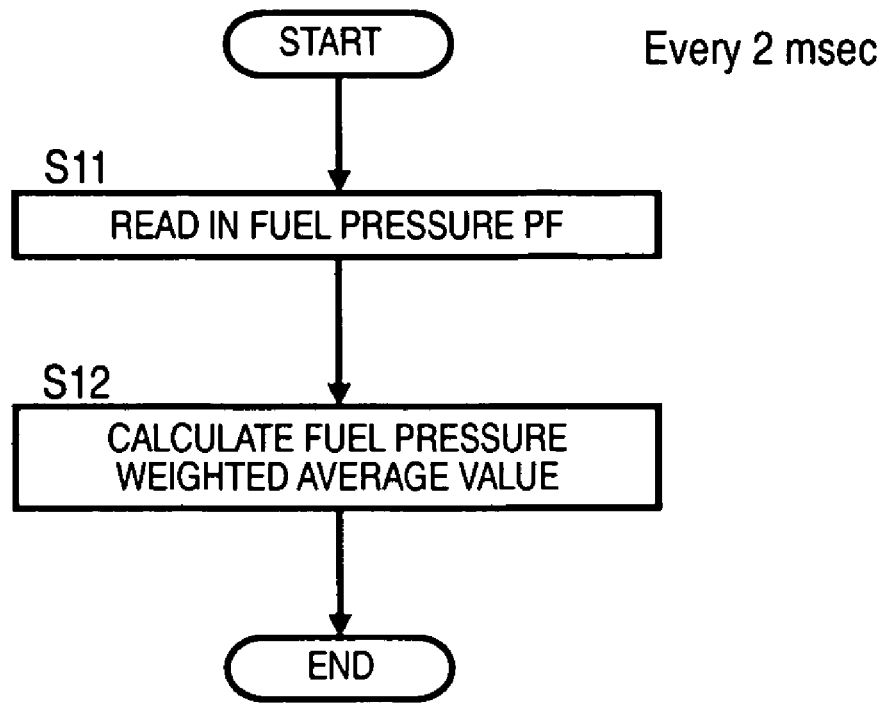
FIG. 7 is a flowchart for explaining how the common rail fuel pressure weighted average value is calculated.

FIG. 7 shows a control sequence that is executed once per prescribed period of time (e.g., every 2 msec) in order to calculate a weighted average value AVEPF of the common rail fuel pressure.

In step S11 the engine controller 41 reads in the common rail fuel pressure Pf detected by the fuel pressure sensor 42, and in step S12 the engine controller calculates the weighted average value AVEPF of the common rail fuel pressure using the equation (1) shown below.

$$AVEPF = Pf \times \text{weighted average coefficient} + AVEPF \text{ (previous cycle)} \times (1 - \text{weighted average coefficient}) \quad (1)$$

The value "AVEPF (previous cycle)" is the AVEPF value obtained in the previous cycle.

The common rail fuel pressure weighted average value AVEPF is used in step S52 of the flowchart shown in FIG. 12(A) (described later) in order to calculate the common rail fuel pressure estimate value PFUEL_Y and in step S57 of the flowchart shown in FIG. 12(B) in order to calculate the fuel pressure compensation coefficient KINJ1-4 for the first and fourth cylinders.

Figure 8:
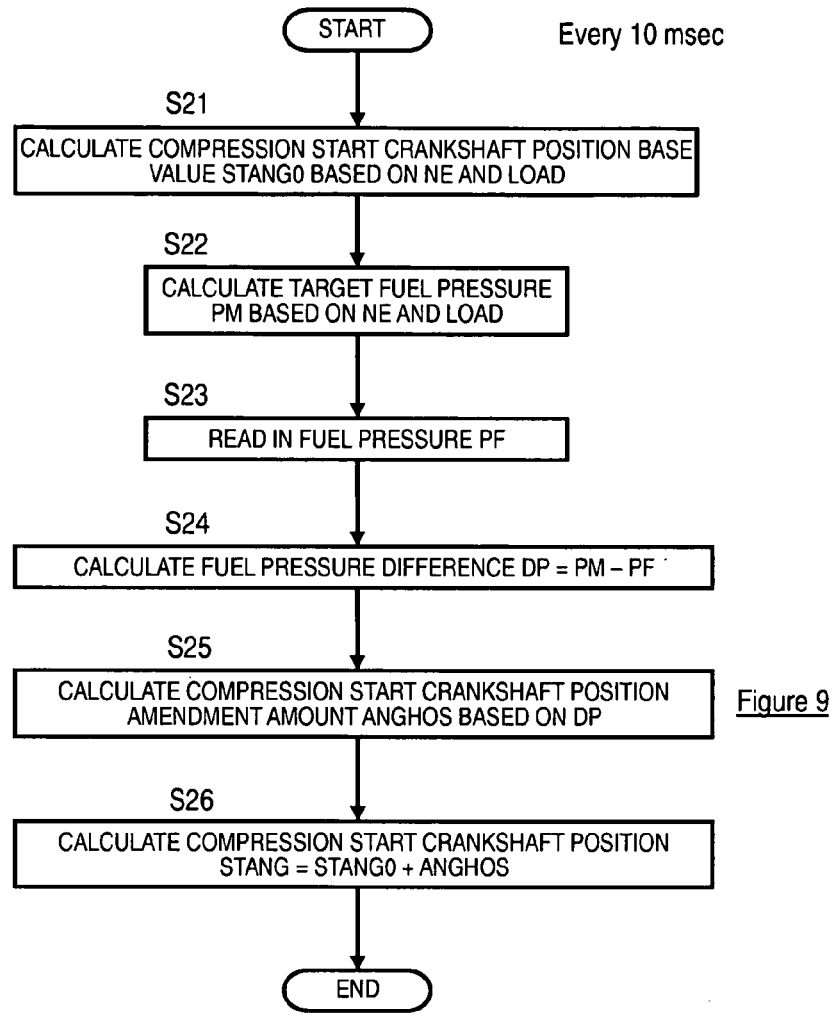
FIG. 8 is a flowchart for explaining how the compression start crankshaft position is calculated.

FIG. 8 shows a control sequence that is executed once per prescribed period of time (e.g., every 10 msec) in order to calculate a compression start crankshaft position STANG that indicates the timing at which the plunger pump 14 starts compressing the fuel.

In step S21, the engine controller 41 searches a prescribed map based on the engine speed Ne and engine load in order to calculate a compression start crankshaft position base value STANG0 (units: degrees) for the plunge pump 14. The compression start crankshaft position base value STANG0 is determined in such a manner that the target fuel pressure is obtained.

The compression start crankshaft position base value STANG0 (as well as the compression start crankshaft position STANG) indicates the angular distance between the crankshaft position where the plunger lift amount of the plunger pump 14 is zero and the crankshaft position where the plunger pump 14 starts compressing the fuel (see STANG on the second curve of FIG. 4).

In step S22, the engine controller 41 calculates the target fuel pressure Pm by searching a prescribed map based on the engine speed Ne and the engine load. The value of the target fuel pressure Pm basically increases as the engine load increases and as the engine speed Ne increases.

In step S23, the engine controller 41 reads in the actual common rail fuel pressure Pf (units: Pa) detected by the fuel pressure sensor 42. In step S24, the engine controller 41 calculates the difference dp between the target fuel pressure Pm and the actual common rail fuel pressure Pf (dp=Pm−Pf). In step S25, the engine controller 41 uses the fuel pressure difference dp (units: Pa) to search a table of data corresponding to the content shown in FIG. 9 and calculate a compression start crankshaft position adjustment amount ANGHOS (units: degrees). In step S26, the engine controller 41 adds the compression start crankshaft position adjustment amount ANGHOS (e.g., normally, a negative value) to the compression start crankshaft position base value STANG0 to calculate the compression start crankshaft position STANG (units: degrees) of the plunger pump 14.

Figure 9:
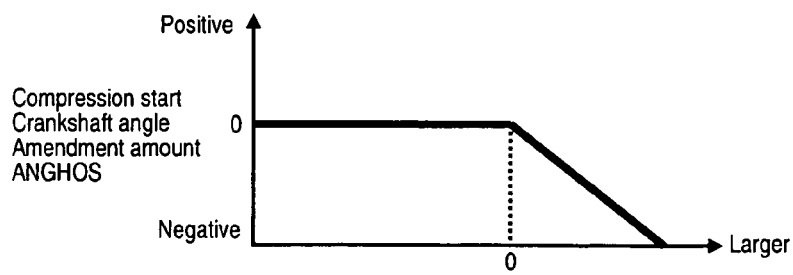
FIG. 9 is a characteristic diagram of the compression start crankshaft position adjustment amount.

As shown in FIG. 9, the compression start crankshaft position adjustment amount ANGHOS is zero when the fuel pressure difference dp is zero, a negative value when the fuel pressure difference dp is a positive value, and zero when the fuel pressure difference dp is negative. The reason the compression start crankshaft position adjustment amount ANGHOS is set to a negative value when the fuel pressure difference dp is a positive value will now be explained. When the fuel pressure difference dp is a positive value, i.e., when the actual common rail fuel pressure Pf is lower than the target fuel pressure Pm, it is necessary to raise the actual common rail fuel pressure Pf to the target fuel pressure Pm. In other words, the compression start timing needs to be earlier (more advanced) so that the pump discharge quantity can be increased and the common rail fuel pressure can be increased toward the target fuel pressure. In order to accomplish this task, the compression start crankshaft position adjustment amount ANGHOS is given a negative value so as to decrease the compression start crankshaft position (angle) of the plunger pump 14 and, thereby, shift the compression start timing to a more advanced timing.

In accordance with a control sequence not shown in the figures, the control solenoid 17 is controlled such that the plunger pump 14 begins compressing the fuel at the calculated compression start crankshaft position STANG.

This compression start crankshaft position STANG is also used in steps 43 and S45 of FIG. 12(A) (discussed later) in order to calculate a lift amount computation start crankshaft position A.

The method of calculating the compression start crankshaft position STANG is not limited to that described above. Although in this embodiment the fuel pressure difference dp between the target fuel pressure and the actual common rail fuel pressure is taken into account when calculating the compression start crankshaft position STANG, it is also acceptable to employ a simpler calculation method that does not take the fuel pressure difference dp into account.

It is also possible to employ the publicly known method of calculating the compression start crankshaft position STANG presented in Japanese Laid-Open Patent Publication No. 2003-106208. In that method, the compression start crankshaft position STANG is calculated using the equation shown below.

$$STANG = REFANG - PUMRE \qquad \text{(Supplementary 1)}$$

In the equation, REFANG is a reference crankshaft angle and PUMRE is the pump delay expressed in terms of a crankshaft angle.

The reference crankshaft angle REFANG used in the equation (Supplementary 1) is a value serving to shift the compression start timing to a more advanced timing so as to increase the pump discharge quantity and return the actual common rail fuel pressure to the target fuel pressure when the actual common rail fuel pressure is smaller than the target fuel pressure. The pump delay angle PUMRE is set such that the higher the battery voltage VB is, the smaller the value to which the pump delay angle PUMRE is set.

While the STANG of this embodiment is expressed relative to the position where the plunger lift amount of the plunger pump 14 is zero, the STANG described in the aforementioned publication is expressed relative to the timing at which the Ref signal is issued. Thus, the relationship indicated below exists between the two STANG values.

$$STANG \text{ of known method} = STANG \text{ of this embodiment} + 163.2° \qquad \text{(Supplementary 2)}$$

Therefore, when the aforementioned known method is used, it is necessary to use the equation (Supplementary 2) to convert the STANG value obtained with the known method to the STANG value of this embodiment.

Figure 10:
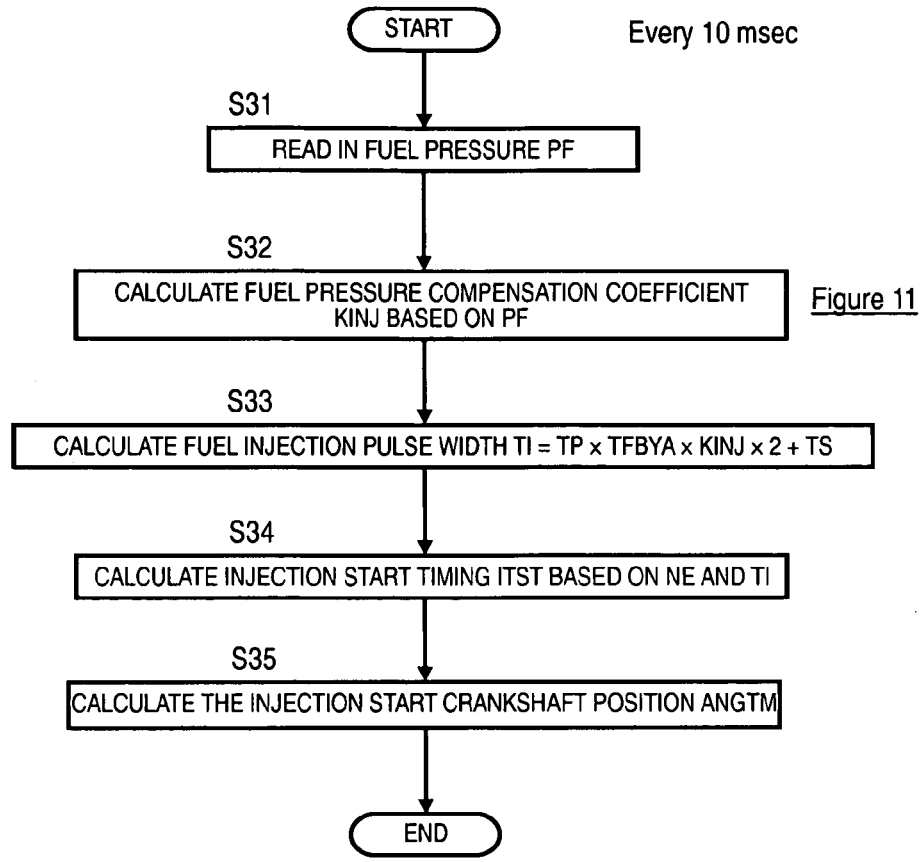
FIG. 10 is a flowchart for explaining how the injection start crankshaft position is calculated.

FIG. 10 shows a control sequence that is executed once per prescribed period of time (e.g., every 10 msec) in order to calculate an injection start crankshaft position ANGTM.

In step S31, the engine controller 41 reads in the actual common rail fuel pressure Pf detected by the fuel pressure sensor 42. In step S32, the engine controller 41 calculates the fuel pressure compensation coefficient KINJ by using the common rail fuel pressure Pf to search a table of data corresponding to the content shown in FIG. 11. In step S33, the engine controller 41 uses the calculated fuel pressure compensation coefficient KINJ in the equation (2) shown below to calculate the fuel injection pulse width Ti (units: msec), which is used to control the fuel injection valve.

$$Ti = TP \times Tfbya \times KINJ \times 2 + Ts \qquad (2)$$

In the equation, Tp is the base injection pulse width, Tfbya is a target equivalence ratio, and Ts is an ineffective injection pulse width.

The base injection pulse width Tp (units: msec) in the equation (2) is a value that is determined based on the cylinder intake air quantity Qcyl and the engine speed Ne (i.e., Tp=K×Qcyl/Ne) and serves to achieve an air-fuel mixture having approximately the stoichiometric air-fuel ratio. The cylinder intake air quantity Qcyl is calculated based on the intake air quantity Qa detected by the air flow sensor using a well-known method.

The target equivalence ratio Tfbya (unitless) in the equation (2) has a value of 1.0 when the engine operating state is in a stoichiometric operating region within the homogeneous combustion region or in the stratified combustion region. When the engine operating state is in a region of lean air-fuel ratios within the homogeneous combustion region, the value of the target equivalence ratio Tfbya is a positive value less than 1.0 and the engine operates with so-called lean combustion.

The ineffective injection pulse width Ts (units: msec) in the equation (2) is a value that depends on the battery voltage.

The base injection pulse width Tp, the target equivalence ratio Tfbya, and the ineffective injection pulse width Ts are calculated in a background job that is not shown in the figures.

In step S34, the engine controller 41 converts the fuel injection pulse width Ti into a crankshaft angle (units: degrees) using the engine speed Ne at that time and calculates the injection start timing ITst (units: degrees BTDC) by finding the crankshaft position that precedes the injection end timing ITend (units: degrees BTDC) by the amount of the calculated crankshaft angle. The injection end timing ITend is a fixed value indicating a crankshaft angle that is measured in the direction of more advanced timings from the crankshaft position where the compression top dead center position of each cylinder occurs. Consequently, the injection start timing ITst, too, is expressed as a crankshaft angle measured in the direction of more advanced timings from the crankshaft position where the compression top dead center position of each cylinder occurs.

In step S35, based on the injection start timing ITst, the engine controller 41 calculates the injection start crankshaft position ANGTM (units: degrees), which is expressed as the angular distance from the timing where the Ref signal is issued to the injection start timing ITst. The injection start crankshaft position ANGTM calculated here is the angular distance between the timing at which the Ref signal is issued and the injection start timing ITst, and thus, serves to describe the injection start timing of all cylinders. FIG. 4 shows the injection start crankshaft position ANGTM of the third cylinder as a representative example.

The timing at which the Ref signal of each cylinder is issued depends on the engine specifications but it is predetermined to be such a value as, for example, 110° before top dead center of the compression stroke. Consequently, assuming the timing of the Ref signal issuance is 110° BTDC, the injection start crankshaft position ANGTM (units: degrees) can be found by subtracting the injection start timing ITst (units: degrees BTDC) from 110° BTDC.

This injection start crankshaft position ANGTM is also used in step S46 of FIG. 12(A) (discussed later) in order to calculate a lift amount computation end crankshaft position B.

Figure 12:
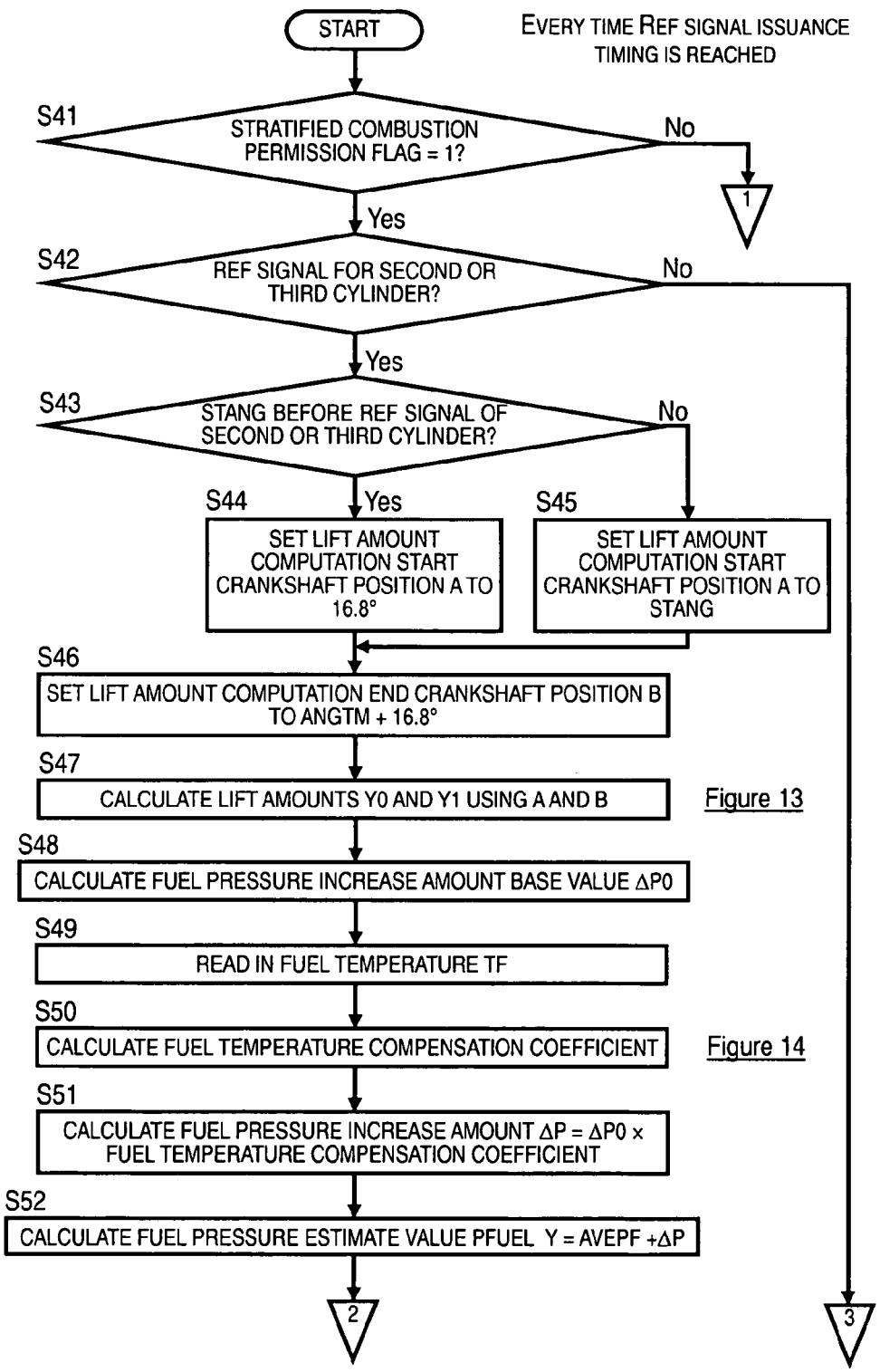
FIG. 12(A) is a flowchart for explaining how the injection start timing is calculated.
FIG. 12(B) is a flowchart for explaining how the injection start timing is calculated.
Figure 12B:
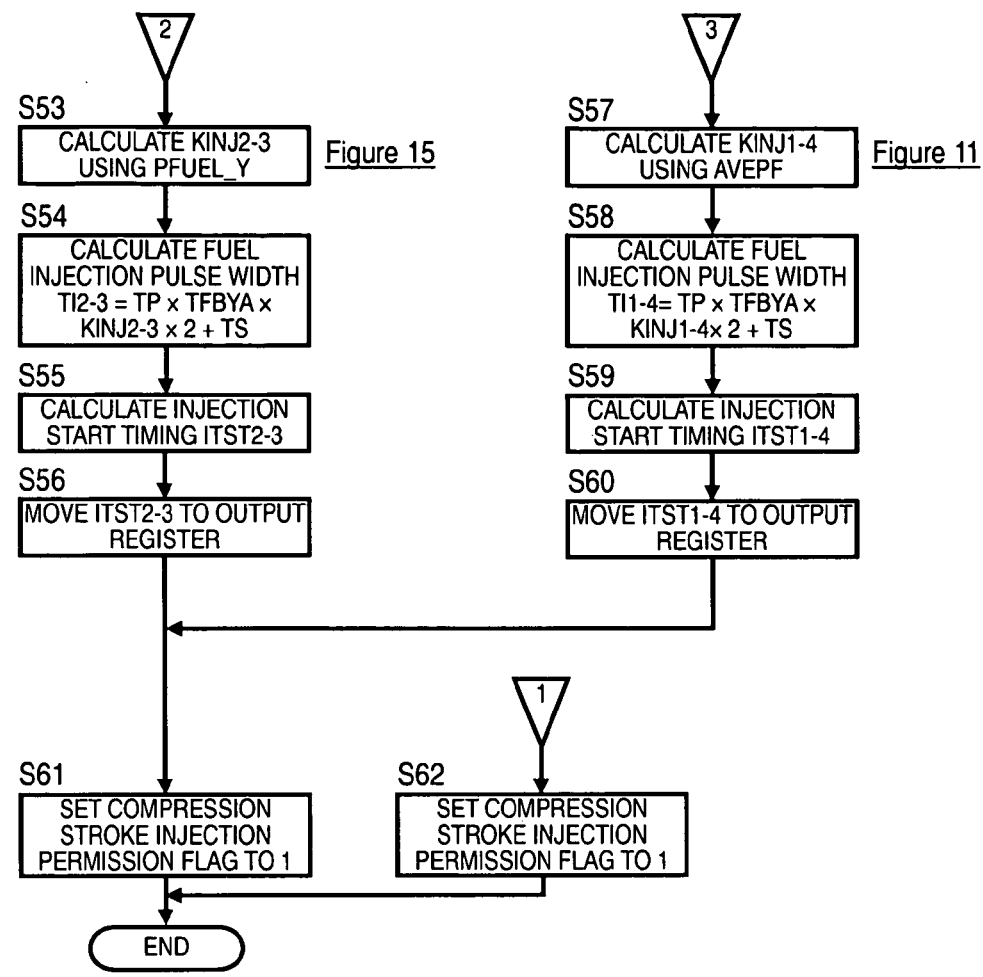

The control sequences shown in FIG. 12(A) and FIG. 12(B) are for calculating the injection start timing (injection timing) and are executed each time a Ref signal issuance timing is reached. The Ref signal is calculated based on a signal from a crankshaft position sensor 43 and a signal from a camshaft position sensor 44 and indicates the crankshaft reference position of each cylinder.

In step S41, the engine controller 41 checks the status of the stratified combustion permission flag set in the control sequence shown in FIG. 6. If the value of the stratified combustion permission flag is 0, the compression stroke injection should not be permitted and the engine controller 41 proceeds to step S62 where it sets the compression stroke injection permission flag to 0.

If the value of the stratified combustion permission flag is 1, then the engine controller 41 proceeds to step S42 where it determines if the Ref signal issuance timing just reached is for the second or third cylinder. If the Ref signal issuance timing just reached is for the second or third cylinder, the engine controller 41 determines that the common rail fuel pressure will rise during the period from the current timing until fuel injection timing occurring immediately thereafter. In steps S43 to S51, the engine controller 41 calculates a common rail fuel pressure increase amount ΔP (units: Pa) that indicates the amount by which the common rail fuel pressure could rise during the period from the current timing until fuel injection timing. In step S52, the engine controller 41 adds the common rail fuel pressure increase amount ΔP to the current value of the common rail fuel pressure weighted average value AVEPF so as to calculate the common rail fuel pressure estimate value PFUEL_Y (units: Pa), which is an estimate of the common rail fuel pressure that will exist at the fuel injection timing of the second or third cylinder.

More specifically, in step S43, the engine controller 41 determines if the compression start crankshaft position STANG calculated with the control sequence shown in FIG. 8 is more advanced (occurs earlier) than the Ref signal issuance timing of the second or third cylinder. In FIG. 5, a compression start crankshaft position STANG that is more advanced than the Ref signal issuance timing of the second or third cylinder is indicated as STANGa and a compression start crankshaft position STANG that is more retarded than the Ref signal issuance timing of the second or third cylinder is indicated as STANGb.

If the compression start crankshaft position STANG is like the compression start crankshaft position STANGa shown in the figure, then the common rail fuel pressure will rise during the range of crankshaft positions occurring between t1 and t2 (the range a in the figure). Consequently, the angular distance (16.8°) between the crankshaft position where the plunger lift amount of the plunger pump 14 is zero and the crankshaft position corresponding to t1 is the lift amount computation start crankshaft position A. Similarly, angular distance (16.8°+ANGTM) between the crankshaft position where the plunger lift amount of the plunger pump 14 is zero and the crankshaft position corresponding to t2 is the lift amount computation end crankshaft position B.

Meanwhile, the compression start crankshaft position STANG is like the compression start crankshaft position STANGb shown in the figure, then the common rail fuel pressure will rise during the range of crankshaft positions occurring between tb and t2 (the range b in the figure). Consequently, the angular distance (STANG) between the crankshaft position where the plunger lift amount of the plunger pump 14 is zero and the crankshaft position corresponding to tb is the lift amount computation start crankshaft position A. Similarly, angular distance (16.8°+ANGTM) between the crankshaft position where the plunger lift amount of the plunger pump 14 is zero and the crankshaft position corresponding to t2 is the lift amount computation end crankshaft position B.

Thus, when the compression start crankshaft position STANG is more advanced than the Ref signal of the second or third cylinder, the engine controller 41 proceeds to step S44 and sets the value of the lift amount computation start crankshaft position A (units: degrees) to 16.8°, which is the input timing of the Ref signal for the second or third cylinder. As shown in FIG. 5, 16.8° is angular distance from the crankshaft position where the plunger lift amount of the plunger pump 14 is zero to the crankshaft position where the Ref signal of the second cylinder (or third cylinder) is issued. The reason the input timing of the Ref signal of the second or third cylinder is used as the lift amount computation start crank angle when the compression start crankshaft position STANG is more advanced than the Ref signal of the second or third cylinder is to ensure that even if compression by the plunger stroke 14 starts before the issuance timing of the Ref signal of the second or third cylinder, the injection start timing calculation timing will occur at the issuance timing of the Ref signal of the second or third cylinder and, thus, the fuel pressure expected to exist at the fuel injection timing will be estimated at the issuance timing of the Ref signal of the second or third cylinder.

When the compression start crankshaft position STANG is more retarded than the Ref signal of the second or third cylinder, the engine controller 41 proceeds from step S43 to step S45 and sets the value of the lift amount computation start crankshaft position A (units: degrees) to the value of the compression start crankshaft position STANG calculated in the control sequence shown in FIG. 8. The reason the lift amount computation start crankshaft position A is set to the compression start crankshaft position STANG when the compression start crankshaft position STANG is more retarded than the Ref signal of the second or third cylinder is to ensure that the plunger pump 14 does not start compressing until the compression start crankshaft position STANG is reached.

In step S46, the engine controller 41 sets the lift amount computation end crankshaft position B (units: degrees) to the value obtained by adding 16.8° to the injection start crankshaft position ANGTM calculated in the control sequence shown in FIG. 10. The reason 16.8° is added is to make the units match with the units of the lift amount computation start crankshaft position A. In other words, since the injection start crankshaft position ANGTM is measured relative to the timing at which the Ref signal is issued, 16.8° is added to convert it to a value measured relative to the crankshaft position where the plunger lift amount of the plunger pump 14 is zero.

Figure 13:
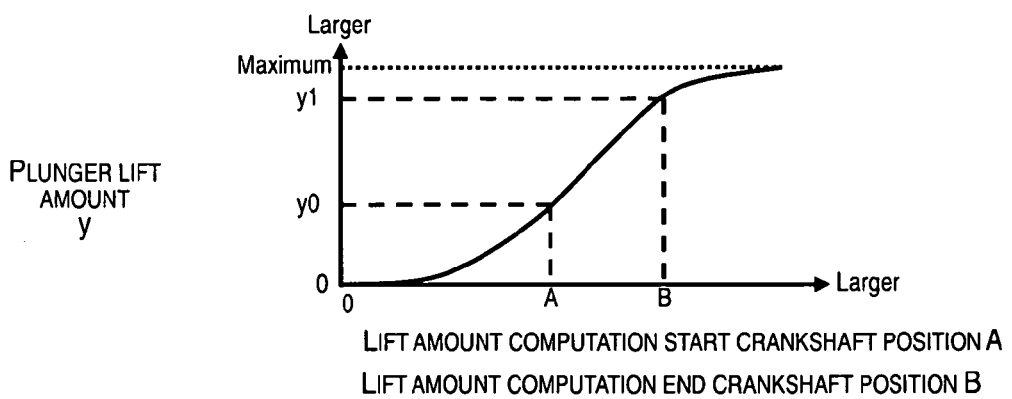
FIG. 13 is a characteristic diagram of the plunger lift amount.

In step S47, the engine controller 41 uses the lift amount computation start crankshaft position A and the lift amount computation end crankshaft position B to search a table of data corresponding to the content shown in FIG. 13 and find the plunger lift amount y0 (units: mm) at the lift amount computation start crankshaft position A and the plunger lift amount y1 (units: mm) at the lift amount computation end crankshaft position B.

As illustrated in FIG. 13, the plunger lift amount table expresses the portion of the plunger lift characteristic that spans from the crankshaft position where the plunger lift amount is zero to the crankshaft position where the plunger lift amount is maximum.

In step S48, the engine controller 41 uses the plunger lift amounts y0 and y1 in the equation shown below to calculate a common rail fuel pressure increase amount base value ΔP0 (units: Pa).

$$\Delta P0 = K \times (y1-y0) \times \text{Apump}/(Vcom + V0pump - y0\text{Apump}) \quad (3)$$

In the equation, K is the bulk modulus, Apump is the cross sectional area of the plunger of the plunger pump, V0pump is the maximum volume of the compression chamber of the plunger pump, and Vcom is the volume of the common rail.

Angular distance between the lift amount computation start crank angle A and the lift amount computation end crank angle B is equivalent to the angular distance between the injection timing calculating timing and the fuel injection timing. Therefore, the equation (3) serves to estimate the amount by which the common rail fuel pressure rises based on the angular distance B−A and the plunger lift amount of the plunger pump 14, i.e., the value of y1−y0 (see FIG. 13).

In the equation (3), the bulk modulus K, the cross sectional area Apump of the plunger of the plunger pump, maximum volume V0pump of the compression chamber of the plunger pump, and the common rail volume Vcom are all constants.

Figure 17:
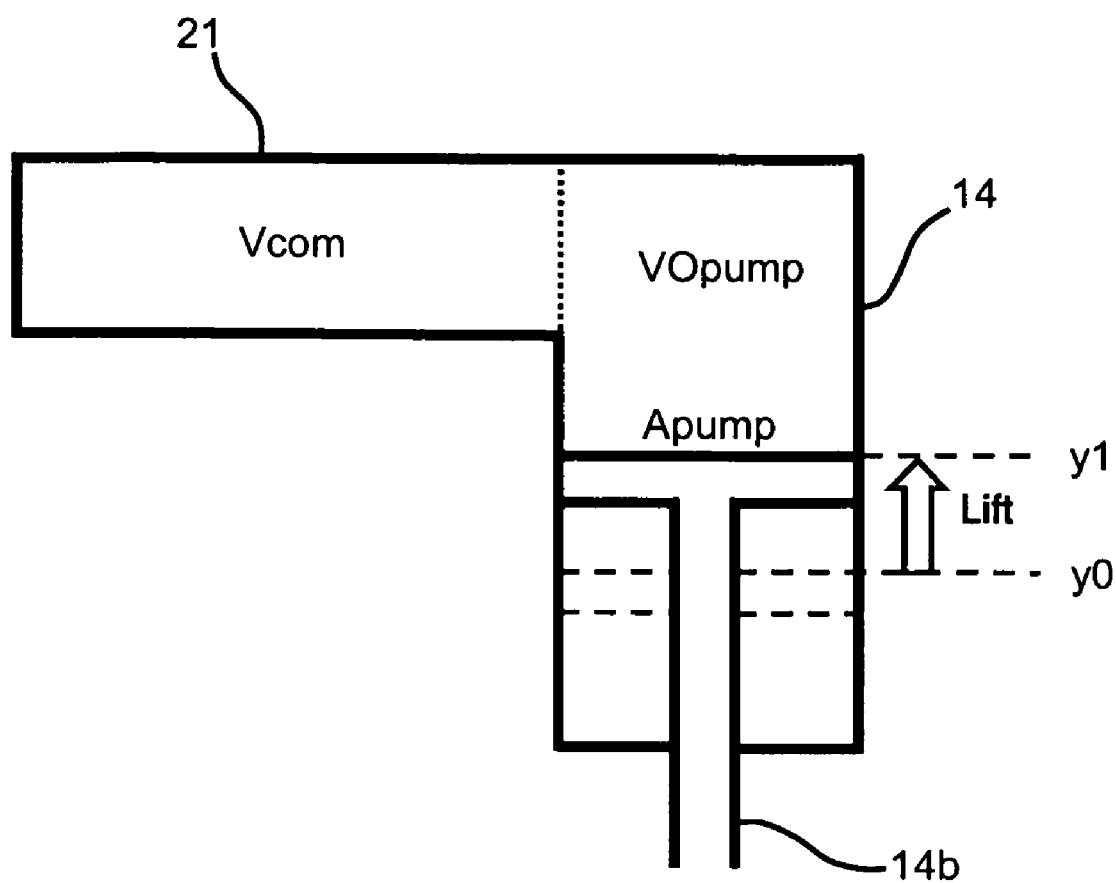
FIG. 17 is a volume model for the plunger pump and the common rail.

The method of arriving at the equation (3) will now be described. FIG. 17 shows a volume model for the plunger pump 14 and the common rail 21. When the pump plunger 14b moves from the position where the plunger lift amount is y0 to the position where the plunger lift amount is y1 as shown in FIG. 17, the volume of the compression chamber is reduced and the pressure rises by an increase amount ΔP calculated as shown below.

$$\Delta P = K \times \Delta V/V \quad \text{(Supplementary 3)}$$

The volume decrease amount ΔV on the right side of the equation (Supplementary 3) is calculated with the expression ΔV=(y1−y0)×Apump, where Apump is the cross sectional area of the plunger. Meanwhile, the volume V on the right side of the equation (Supplementary 3) is the volume after the volume decrease and is calculated with the equation V=Vcom+V0pump−y0×Apump, where V0pump is the maximum volume of the compression chamber of the plunger pump 14 and Vcom is the volume of the common rail. The equation (3) presented above is obtained by substituting the expressions on the right sides of these two equations into the equation (Supplementary 3).

Figure 14:
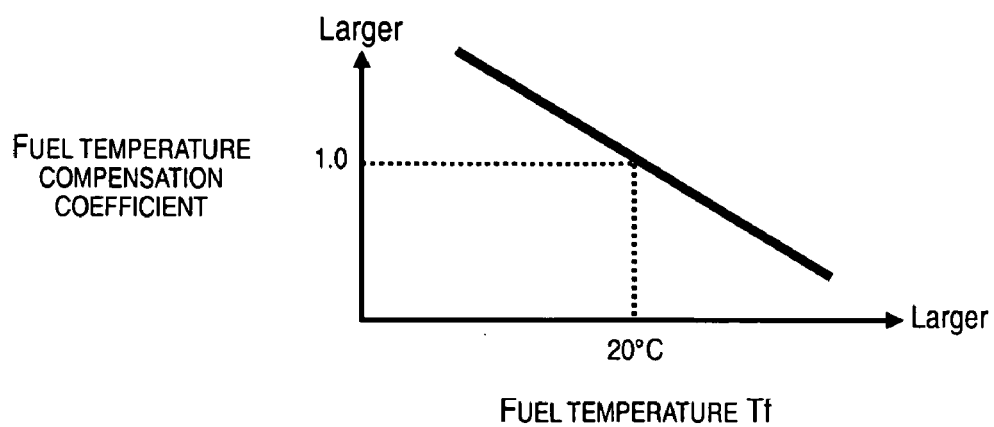
FIG. 14 is a characteristic diagram of the fuel temperature compensation coefficient.

In step S49, the engine controller 41 reads the common rail fuel temperature Tf detected by a fuel temperature sensor 47 and proceeds to step S50 where it uses the common rail fuel temperature Tf to search a table of data corresponding to the content shown in FIG. 14 and find a fuel temperature compensation coefficient. In step S51, the engine controller 41 multiplies the common rail fuel pressure increase amount base value ΔP0 by the fuel temperature compensation coefficient and sets the resulting value as the common rail fuel pressure increase amount ΔP (units: Pa), i.e., the amount by which the common rail fuel pressure rises during the period from the current timing until the fuel injection timing.

The pumping efficiency of the plunger pump 14 changes as the common rail fuel temperature Tf moves away from a common rail fuel temperature reference value (e.g., 20° C.). The fuel temperature compensation coefficient is contrived to compensate for the amount by which the pumping efficiency has changed with respect to the pumping efficiency obtained at the common rail fuel temperature reference value.

As shown in FIG. 14, the fuel temperature compensation coefficient is a value smaller than 1.0 when the common rail fuel temperature Tf is higher than the common rail fuel temperature reference value (20° C.) and a value larger than 1.0 when the common rail fuel temperature Tf is lower than the common rail fuel temperature reference value. When the common rail fuel temperature is higher than the common rail fuel temperature reference value, the pumping efficiency of the plunger pump 14 is lower than it is when the common rail fuel temperature equals the common rail fuel temperature reference value. Conversely, when the common rail fuel temperature is lower than the common rail fuel temperature reference value, the pumping efficiency of the plunger pump 14 is higher than it is when the common rail fuel temperature equals the common rail fuel temperature reference value.

In step S52, the engine controller 41 reads in the common rail fuel pressure weighted average value AVEPF calculated with the control sequence shown in FIG. 7 and adds it to the common rail fuel pressure increase amount ΔP (which is the amount the common rail fuel pressure could rise during the period from the current timing to the fuel injection timing). The engine controller 41 then sets the resulting value as the estimate value PFULE_Y (units: Pa) of common rail fuel pressure at the fuel injection timing of the second or third cylinder. In short, in step S52, the engine controller 41 calculates the estimate value PFULE_Y of common rail fuel pressure at the fuel injection timing of the second or third cylinder.

$$PFUEL\_Y = AVEPF + \Delta P \quad (4)$$

The common rail fuel pressure weighted average value AVEPF on the right side of the equation (4) is obtained by sampling the value calculated by the control sequence shown in FIG. 7 at the timing when the controls sequence shown in FIGS. 12(A) and 12(B) is executed, i.e., at the injection start timing calculation timing. Consequently, AVEPF is the value at the Ref signal input timing of the second or third cylinder.

Although in this embodiment the weighted average value AVEPF of the common rail fuel pressure is used as the common rail fuel pressure at the current timing, it is also possible to simply use the actual common rail fuel pressure Pf.

Figure 15:
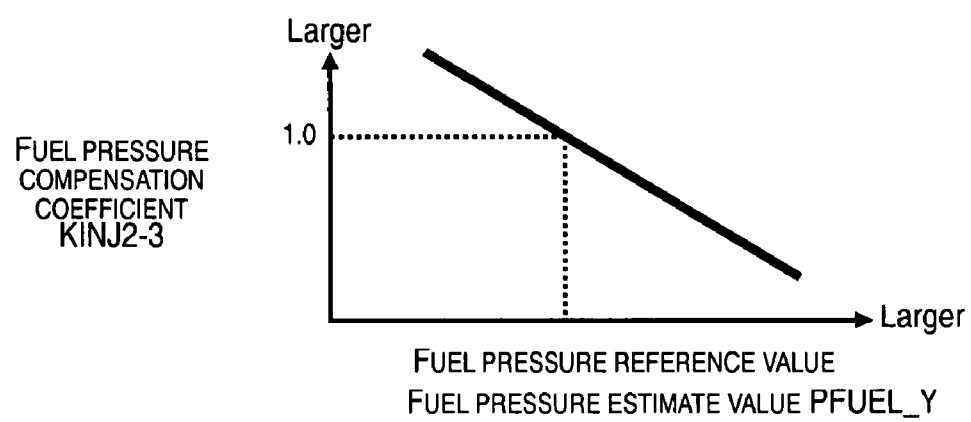
FIG. 15 is a characteristic diagram of the fuel pressure compensation coefficient for the second or third cylinder.

The control operations of steps S53 to S55 of FIG. 12(B) are basically the same as the control operations of steps S32 to S34 of FIG. 10. In other words, in step S53 the engine controller 41 uses the common rail fuel pressure estimate value PFUEL_Y to search a table of data corresponding to the content shown in FIG. 15 and, thereby, calculate a fuel pressure compensation coefficient KINJ2-3 for the second or third cylinder. The characteristic curve shown in FIG. 15 is obtained by simply converting the parameters Pf and KINJ on the horizontal and vertical axes, respectively, of the curve shown in FIG. 11 into PFUEL_Y and KINJ2-3, respectively.

In step S54, the engine controller 41 uses the fuel pressure compensation coefficient KINJ2-3 of the second or third cylinder in the equation (5) shown below to calculate the fuel injection pulse width Ti2-3 (units: msec) of the second or third cylinder.

$$Ti2\text{-}3 = TP \times Tfbya \times KINJ2\text{-}3 \times 2 + Ts \quad (5)$$

The base injection pulse width Tp, the target equivalence ratio Tfbya, and the ineffective injection pulse width Ts of the equation (5) are calculated with a background job that is not shown in the figures.

In step S55, the engine controller 41 converts the fuel injection pulse width Ti2-3 of the second or third cylinder into a crankshaft angle using the engine speed Ne at that time and calculates the injection start timing ITst2-3 (units: degrees BTDC) of the second or third cylinder by finding the crankshaft position that precedes the injection end timing ITend (units: degrees BTDC) by the amount of the crankshaft angle converted from the pulse width Ti2-3. The injection end timing ITend is a fixed value indicating a crankshaft angle that is measured in the direction of more advanced timings from the crankshaft position where the compression top dead center position of each cylinder occurs. Consequently, the injection start timing ITst2-3, too, is expressed as a crankshaft angle measured in the direction of more advanced timings from the crankshaft position where the compression top dead center position of the second or third cylinder occurs.

In step S56, the engine controller 41 moves the calculated injection start timing ITst2-3 of the second or third cylinder to an output register.

Meanwhile, if in step S42 of FIG. 12(A) the engine controller 41 determines that the Ref signal issuance timing just reached is for the first or fourth cylinder, the engine controller 41 proceeds to steps S57 to S60 of FIG. 12(B) and calculates the injection start timing of the first or fourth cylinder in the same manner as is done in steps S32 to S34. More specifically, in step S57, at the Ref signal issuance timing of the first or fourth cylinder, the engine controller 41 reads the common rail fuel pressure weighted average value AVEPF calculated with the control sequence shown in FIG. 7. Then the engine controller 41 calculates the fuel pressure compensation coefficient KINJ1-4 of the first or fourth cylinder by using the common rail fuel pressure weighted average value AVEPF to search a table of data corresponding to the content shown in FIG. 11. In step S58, the engine controller 41 uses the calculated fuel pressure compensation coefficient KINJ1-4 in the equation (6) shown below to calculate the fuel injection pulse width Ti1-4 (units: msec) of the first or fourth cylinder.

$$Ti1\text{-}4 = TP \times Tfbya \times KINJ1\text{-}4 \times 2 + Ts \quad (6)$$

The base injection pulse width Tp, the target equivalence ratio Tfbya, and the ineffective injection pulse width Ts of the equation (6) are calculated with a background job that is not shown in the figures.

In step S59, the engine controller 41 converts the fuel injection pulse width Ti1-4 into a crankshaft angle using the engine speed Ne at that time and calculates the injection start timing Itst1-4 (units: degrees BTDC) of the first or fourth cylinder by finding the crankshaft position that precedes the injection end timing ITend (units: degrees BTDC) by the amount of the crankshaft angle converted from the pulse width Ti1-4. The injection end timing ITend is a fixed value indicating a crankshaft angle that is measured in the direction of more advanced timings from the crankshaft position where the compression top dead center position of each cylinder occurs. Consequently, the injection start timing ITst1-4, too, is expressed as a crankshaft angle measured in the direction of more advanced timings from the crankshaft position where the compression top dead center position of the first or fourth cylinder occurs.

In step S60, the engine controller 41 moves the calculated injection start timing ITst1-4 of the first or fourth cylinder to an output register.

Finally, in step S61, the engine controller sets the compression stroke injection permission flag to 1 and ends the current cycle of the control routine.

Figure 16:
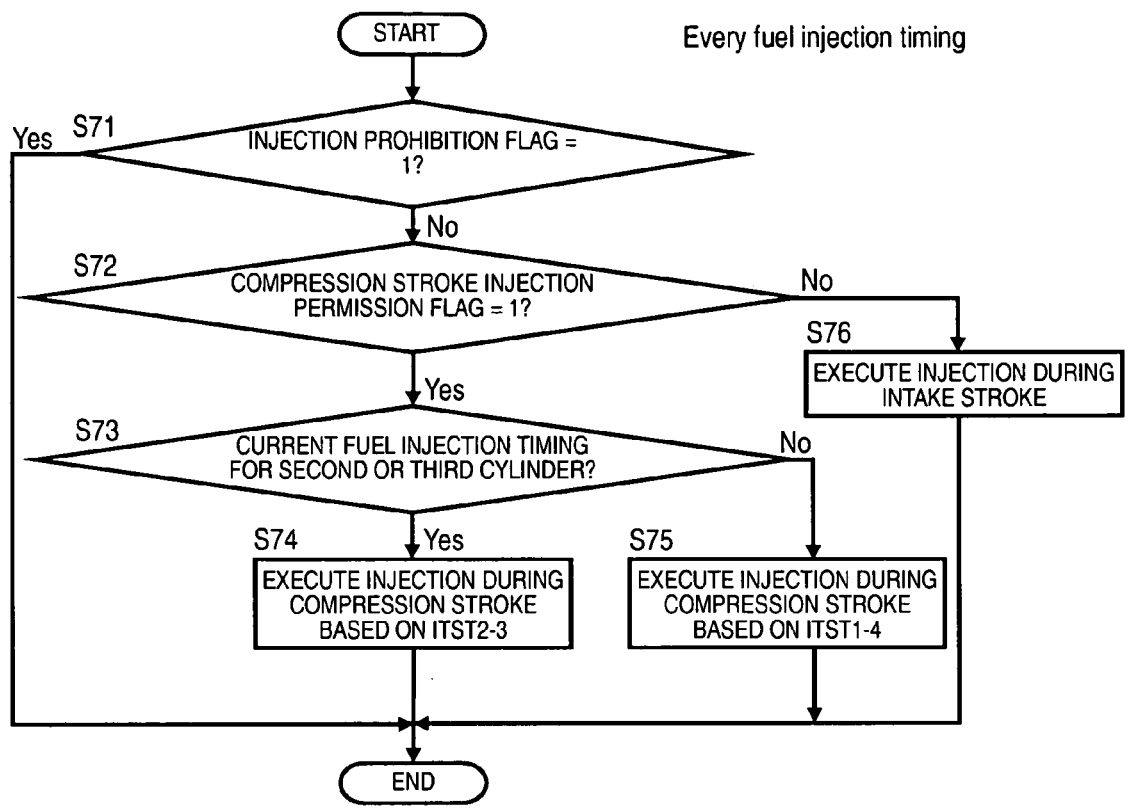
FIG. 16 is a flowchart for explaining how a fuel injection is executed.

Basically, in this embodiment, step S54 of FIG. 12(B) functions as the fuel injection quantity calculating section, steps S48 and S52 of FIG. 12(B) function as the fuel pressure estimate value calculating section, step S54 of FIG. 12(B) functions as the fuel injection quantity correcting section, and steps S73 and S74 of FIG. 16 function as the fuel injection valve open/close section.

The present invention assumes that the fuel is injected during the intake stroke (intake stroke injection) when the engine is operating in the homogeneous combustion region. Since the present invention is not concerned with the fuel injection control executed when the engine is in the homogeneous combustion region, i.e., when the value of the stratified combustion permission flag is 0, the method of calculating the fuel injection pulse width when the engine is operating in the homogeneous combustion region is omitted from the explanation of this embodiment for the sake of brevity.

FIG. 16 is a flowchart of a control sequence for executing fuel injection and is executed at the fuel injection timing (fuel injection start timing) of each cylinder.

In step S71, the engine controller 41 checks the status of the injection prohibition flag set in the control sequence shown in FIG. 6. If the value of the injection prohibition flag is 1, the engine controller 41 ends the current cycle of the control routine without executing fuel injection.

If the value of the injection prohibition flag is found to be 0 in step S71, the engine controller 41 proceeds to step S72 and checks the value of the compression stroke injection permission flag set in the control sequence shown in FIG. 7. If the value of the compression stroke injection permission flag is 1, the engine controller 41 proceeds to step S73 and determines if the fuel injection timing of the second or third cylinder has been reached. If the fuel injection timing of the second or third cylinder has been reached, the engine controller 41 proceeds to step S74 and executes a compression stroke fuel injection into the second or third cylinder using the injection start timing Its2-3 and injection end timing ITe of the second and third cylinders. In other words, the engine controller 41 opens the fuel injection valve 31B of the second cylinder or the fuel injection valve 31C of the third cylinder for the duration of the period spanning from the injection start timing Its2-3 to the injection end timing ITe.

If the fuel injection timing of the first or fourth cylinder has been reached, the engine controller 41 proceeds to step S73 and executes a compression stroke fuel injection into the first or fourth cylinder using the injection start timing Its1-4 and injection end timing ITe of the first and fourth cylinders. In other words, the engine controller 41 opens the fuel injection valve 31A of the first cylinder or the fuel injection valve 31D of the fourth cylinder for the duration of the period spanning from the injection start timing Its1-4 to the injection end timing ITe of the first and fourth cylinders.

Meanwhile, if the value of the compression stroke injection permission flag is 0, the engine controller 41 proceeds from step S72 to step S76 and executes intake stroke fuel injections into each of the cylinders.

The effects of this embodiment will now be explained.

This embodiment applies to a fuel delivery method for an engine equipped with the pump drive cam 12 driven by the crankshaft 23 of the engine, the high pressure fuel pump 11 that has the pump plunger 14b driven by the pump drive cam 12 as seen in FIG. 1. In this fuel delivery method, the fuel control system is configured and arranged to discharge high-pressure fuel during a rising stroke of the pump plunger 14b and to maintain a prescribed fuel pressure during a falling stroke of the pump plunger 14b, and the fuel injection valves 31A to 31D configured and arranged to open at prescribed fuel injection timings and deliver high-pressure fuel from the high pressure fuel pump 11 into combustion chambers of the engine. Regarding the cylinders whose fuel injection timing occurs during a rising stroke of the pump plunger 14b, i.e., the second and third cylinders, this engine fuel delivery method calculates a common rail fuel pressure estimate value PFUEL_Y at an injection start timing calculation timing (i.e., a prescribed calculation time occurring before the fuel injection timing) of the second or third cylinder. The common rail fuel pressure estimate value PFUEL_Y is an estimate value of the fuel pressure that will be acting on the fuel injection valve of the second or third cylinder when the fuel injection timing of the second or third cylinder is reached. A base injection pulse width Tp (fuel injection quantity) is corrected based on the calculated estimate value PFUEL_Y of the common rail fuel pressure that will exist at the fuel injection timing so as to calculate a fuel injection pulse width Ti2-3 for the second or third cylinder. The fuel injection valve 31B of the second cylinder or the fuel injection valve 31C of the third cylinder is opened at the fuel injection timing of the second or third cylinder in such a manner that a quantity of fuel equivalent to the calculated fuel injection pulse width Ti2-3 (corrected fuel injection quantity) is delivered to the engine. (See steps S42, S48, and S52 of FIG. 12(A), steps S53, S54, S55, and S56 of FIG. 12(B), and steps S73 and S74 of FIG. 16.)

With this embodiment, the fuel injection quantity (Tp) is not corrected based on the fuel pressure (Pf) measured at the prescribed calculation time occurring before the fuel injection timing. Instead, the fuel pressure expected to act on the fuel injection valve at the fuel injection timing is estimated at a timing preceding the fuel injection timing and the fuel injection quantity (Tp) is corrected based on the estimate value (PFUEL_Y) of the fuel pressure. As a result, the fuel injection quantity can be corrected in accordance with the actual fuel pressure that will exist at the fuel injection timing, thereby improving the accuracy with which the fuel injection quantity is corrected based on the fuel pressure and preventing a fuel injection quantity that is too large from being delivered.

A second embodiment will now be described in which the flowcharts shown in FIGS. 12(A) and 12(B) are replaced with the flowcharts shown in FIGS. 19(A) and 19(B). Steps of FIGS. 19(A) and 19(B) that are identical to the steps of FIGS. 12(A) and 12(B) are indicated with the same step numbers.

The second embodiment is intended for an engine having a valve timing control mechanism (hereinafter called "VTC mechanism") that is provided on, for example, a frontward portion of the intake valve camshaft and is capable of controlling the phase of the intake valves to any desired position in a continuous manner while keeping the operating angle constant.

Since the constituent features of VTC mechanisms are well known, a detailed description is omitted here for the sake of brevity. In the case of an electromagnetic VTC mechanism, the valve timing is adjusted by applying a voltage to an electromagnetic retarder and generating a magnetic force. The magnetic force causes a brake to overcome the resistance of a torsional spring and engage with a drum so as to brake the rotation of the drum. This braking of the drum causes the intake valve camshaft to be shifted to a more advanced timing. When a voltage is not applied to the electromagnetic retarder, the intake valve camshaft is in its most retarded position and, thus, the timing of the intake valves is retarded to the maximum possible degree. This most retarded position is the default position. The engine controller 41 controls the VTC mechanism so as to control the intake valve open timing in a continuous fashion in accordance with the operating state of the engine. As a result, the output torque can be improved while also improving the fuel economy and exhaust performance.

Figure 19:
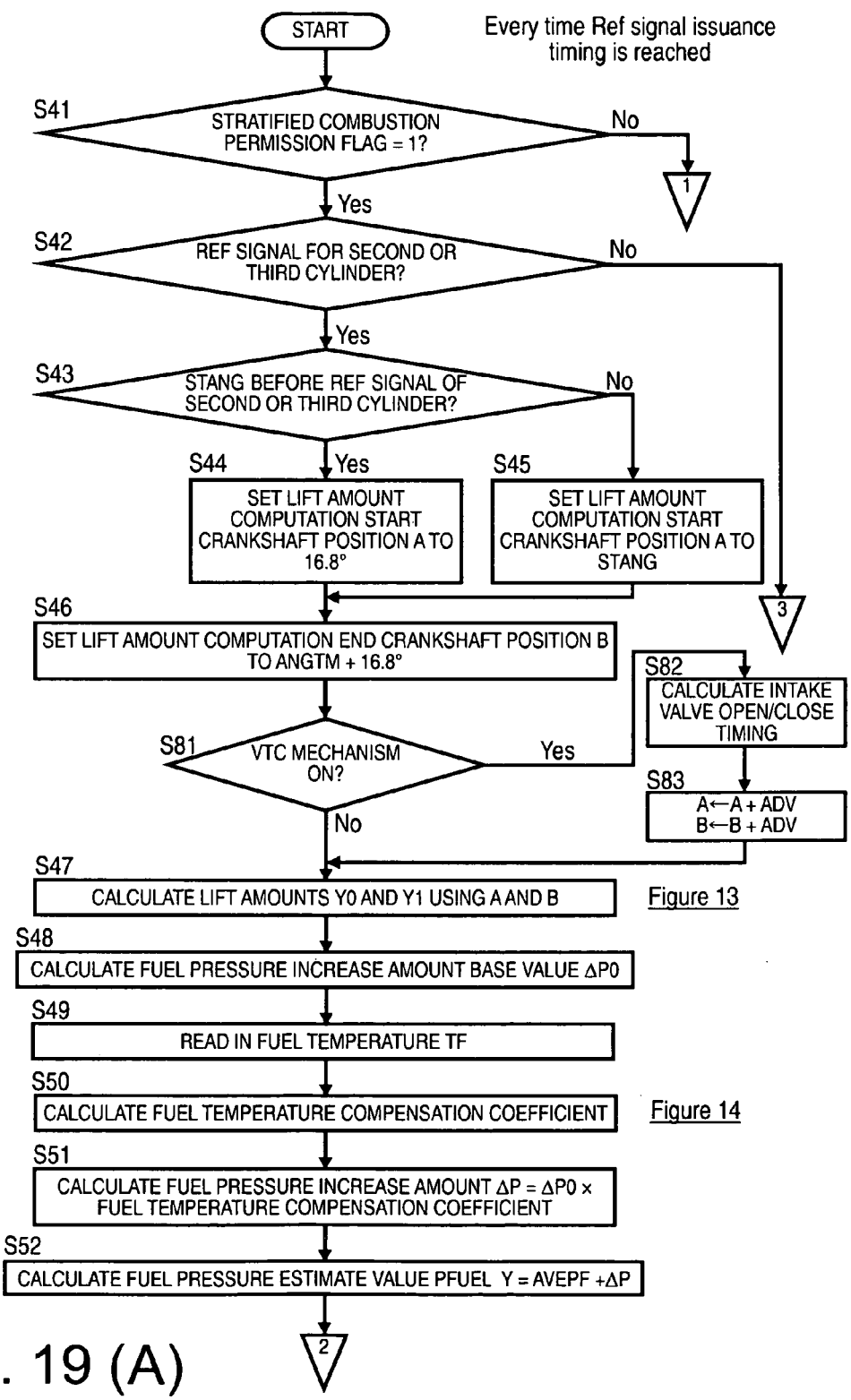
FIG. 19(A) is a flowchart for explaining how the injection start timing is calculated in a second embodiment of the present invention.
FIG. 19(B) is a flowchart for explaining how the injection start timing is calculated in the second embodiment of the present invention.
Figure 19:
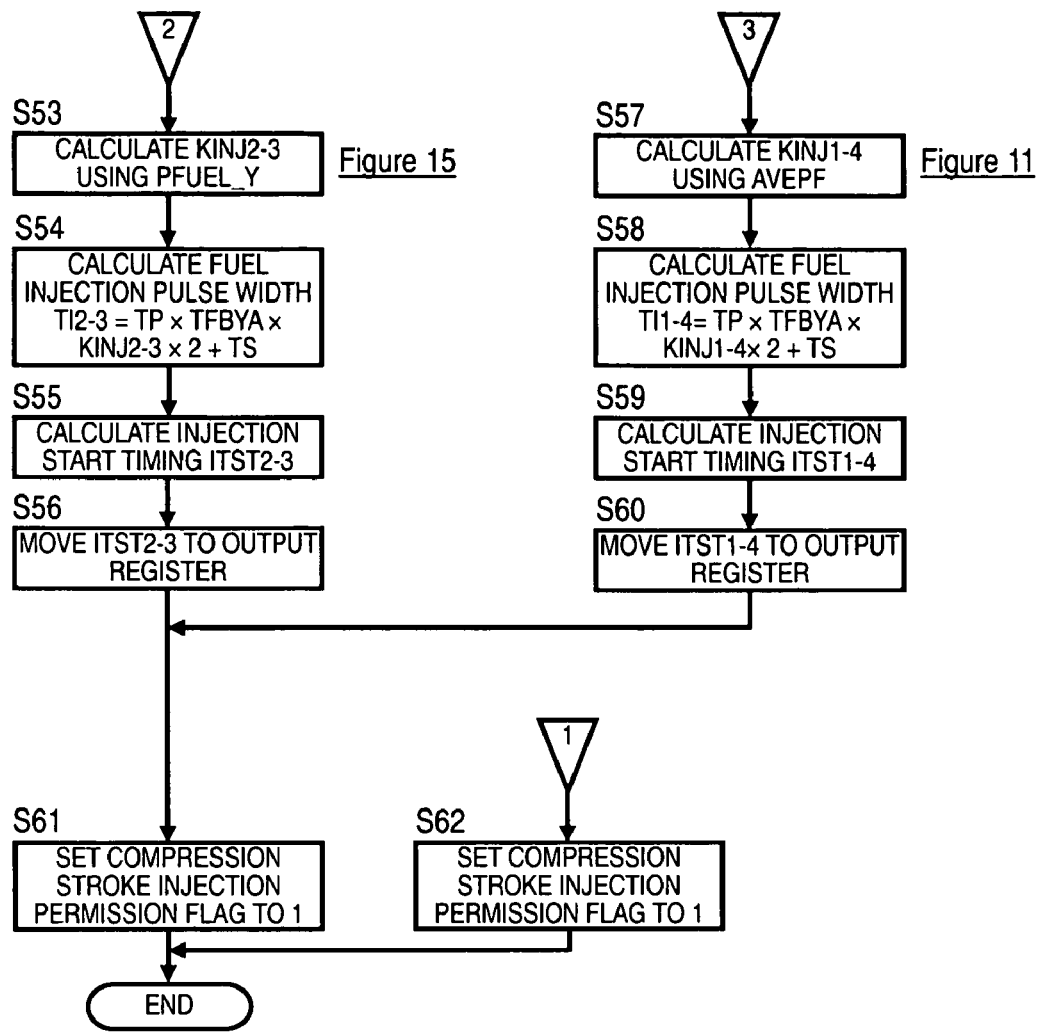

The main differences between the flowcharts shown in FIGS. 12(A) and 12(B) of the first embodiment and the flowcharts shown in FIGS. 19(A) and 19(B) of the second embodiment are found in steps S81, S82, and S83 of FIG. 19(A). In step S81, the engine controller 41 determines if the VTC mechanism is in the midst of operating. This determination is made by checking if a signal is being sent to the VTC mechanism from the engine controller 41. If a signal is not being sent to the VTC mechanism (VTC mechanism is not operating), the engine controller proceeds to step S47 where, similarly to the first embodiment, the engine controller 41 uses the lift amount computation start crankshaft position A and the lift amount computation end crankshaft position B to search a table of data corresponding to the content shown in FIG. 13 and find the plunger lift amount y0 (units: mm) at the lift amount computation start crankshaft position A and the plunger lift amount y1 (units: mm) at the lift amount computation end crankshaft position B.

Meanwhile, if a signal is being sent to the VTC (operation of VTC mechanism is in progress), the engine controller 41 proceeds from step S81 to step S82 and calculates an intake valve open/close timing advancement amount ADV, which is the amount by which the VTC mechanism has advanced the open and close timings of the intake valves. The value of ADV is obtained by acquiring the control quantity being transmitted to the VTC mechanism. In step S83, the engine controller 41 adds the intake valve open/close timing advancement amount ADV to each of the lift amount computation start crankshaft position A and the lift amount computation end crankshaft position B calculated in steps S44 to S46 and sets the resulting sum values as the values of the lift amount computation start crankshaft position A and the lift amount computation end crankshaft position B, respectively. Then, in step S47, the engine controller 41 uses the modified lift amount computation start crankshaft position A and lift amount computation end crankshaft position B to search a table of data corresponding to the content shown in FIG. 13 and find the plunger lift amount y0 (units: mm) at the lift amount computation start crankshaft position A and the plunger lift amount y1 (units: mm) at the lift amount computation end crankshaft position B.

Figure 18:
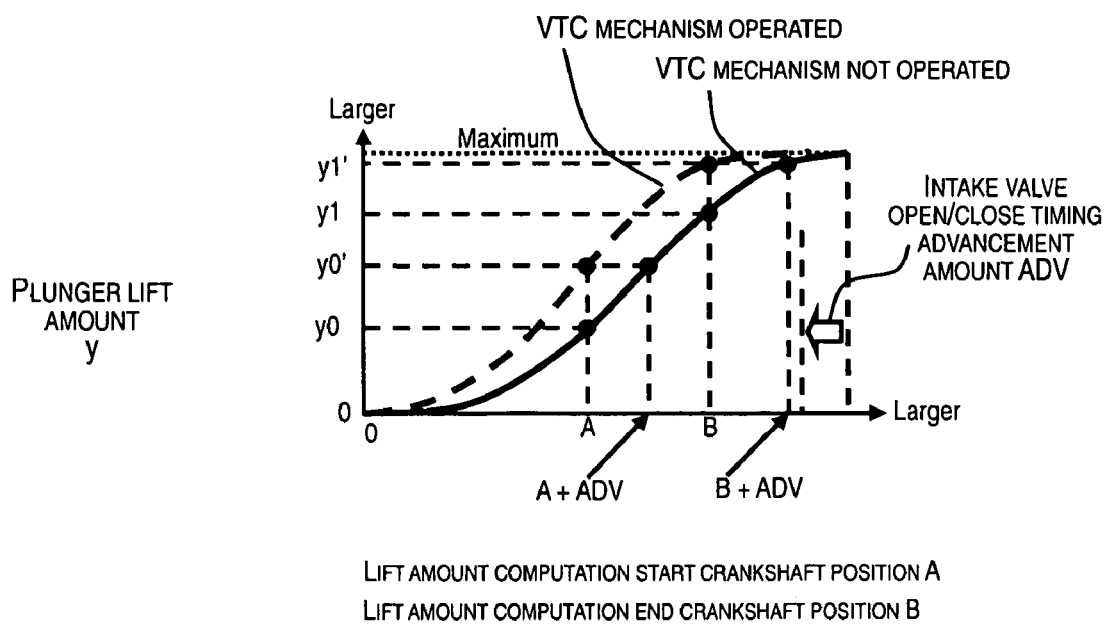
FIG. 18 is a characteristic diagram of the plunger lift amount in accordance with present invention.

The reason the intake valve open/close timing advancement amount ADV is added in step S83 will now be explained. In an engine equipped with a VTC mechanism, the plunger lift amount follows the solid characteristic curve of FIG. 18 when the VTC mechanism is not being operated and is shifted (advanced) to the single-dot chain line characteristic curve when the VTC mechanism is operated and the open/close timing of the intake valves is advanced by the advancement amount ADV. Thus, when the VTC mechanism is operated, the plunger lift amount corresponding to the lift amount computation start crankshaft position A increases from the plunger lift amount y0 to the plunger lift amount y0' and the plunger lift amount corresponding to the lift amount computation start crankshaft position B increases from the plunger lift amount y1 to the plunger lift amount y1'. Consequently, it is necessary to calculate the lift amounts y0' and y1' when the VTC mechanism is being operated. Since the plunger lift characteristic indicated with the single-dot chain line is obtained by translating the plunger lift characteristic indicated with the solid line leftward in a parallel fashion by an amount equal to the open/close timing advancement amount ADV, using the sum values A+ADV and B+ADV to find the plunger lift amounts y0' and y1' on the plunger lift characteristic indicated with the solid line is equivalent to using the values A and B to find the plunger lift amounts y0' and y1' on the plunger lift characteristic indicated with the single-dot chain line. Therefore, the plunger lift amounts y0' and y1' can be found by using the sum values A+ADV and B+ADV to search the characteristic indicated with the solid line in FIG. 18 (which is the characteristic corresponding to a state in which the VTC mechanism is not being operated), i.e., the characteristic shown in FIG. 13.

In this way, the second embodiment makes it possible to find the proper plunger lift amounts in an engine equipped with a VTC mechanism by using the plunger lift characteristic (FIG. 13) corresponding to a state in which the VTC mechanism is not being operated to find the plunger lift amount y0' existing at the lift amount computation start crankshaft position A and the plunger lift amount y1' existing at the lift amount computation end crankshaft position B.

The embodiments described heretofore present cases in which the present invention is applied to a fuel delivery method for an engine equipped with a pump drive cam 12, a high pressure fuel pump 11, and fuel injection valves 31A to 31D. The fuel delivery methods described in the embodiments basically include: calculating a fuel injection quantity based on at least one operating condition of an engine equipped with a high pressure fuel pump to supply high pressure fuel to at least one fuel injection valve that opens at a prescribed fuel injection timing to deliver the high-pressure fuel from the high pressure fuel pump to the engine; calculating an estimated fuel pressure value of the high pressure fuel at a prescribed calculation time occurring before the prescribed fuel injection timing that is indicative of an actual fuel pressure that will be acting on the fuel injection valve; correcting the fuel injection quantity that was previously calculated to a corrected fuel injection quantity based on the estimated fuel pressure value that will exist at the fuel injection timing; and opening the fuel injection valve at the prescribed fuel injection timing to discharge a quantity of fuel equal to the corrected fuel injection quantity.

However, it is also acceptable to apply the present invention to a fuel delivery method for an engine equipped with an actuator driven by a crankshaft, a high pressure fuel pump arranged to be driven by the actuator and configured to discharge high pressure fuel, and a fuel injection valve configured and arranged to open at a prescribed fuel injection timing and deliver high-pressure fuel from the high pressure fuel pump to the engine. A fuel delivery method in accordance with the present invention for such an engine includes the following steps: a fuel injection quantity calculating step in which a fuel injection quantity (Tp) is calculated based on an operating condition(s); a fuel pressure estimate value calculating step that is executed at a prescribed calculation time occurring before the fuel injection timing and contrived to calculate an estimate value (PFUEL_Y) of the fuel pressure that will be acting on the fuel injection valve when the fuel injection timing is reached; a fuel injection quantity correcting step in which the calculated fuel injection quantity (Tp) is corrected based on the calculated estimate value (PFUEL_Y) of the fuel pressure that will exist at the fuel injection timing; and a fuel injection valve open/close step in which the fuel injection valve is opened at the fuel injection timing in such a fashion that a quantity of fuel equal to the corrected fuel injection quantity is delivered to the engine.

Although the embodiments described heretofore are for fuel delivery methods, it is also feasible to apply the present invention to a fuel control system for an engine equipped with an actuator driven by a crankshaft, a high pressure fuel pump arranged to be driven by the actuator and configured to discharge high pressure fuel, and a fuel injection valve configured and arranged to open at a prescribed fuel injection timing and deliver high-pressure fuel from the high pressure fuel pump to the engine. From the above embodiments, an engine fuel control system in accordance with the present invention basically includes a high pressure fuel pump, at least one fuel injection valve and a controller. The high pressure fuel pump is arranged to discharge high pressure fuel. The fuel injection valve is configured and arranged to open at a prescribed fuel injection timing and inject high-pressure fuel from the high pressure fuel pump.

The controller operatively is coupled to the fuel injection valve. The controller basically includes a fuel injection quantity calculating section, a fuel pressure estimate value calculating section, a fuel injection quantity correcting section and a fuel injection valve operating section. The fuel injection quantity calculating section is configured to calculate a fuel injection quantity based on at least one operating condition of the engine. The fuel pressure estimate value calculating section is configured to execute a calculation at a prescribed calculation time occurring before the prescribed fuel injection timing with the calculation estimating an estimated fuel pressure value of the high pressure fuel that will be acting on the fuel injection valve. The fuel injection quantity correcting section is configured to correct the fuel injection quantity that was previously calculated to a corrected fuel injection quantity based on the estimated fuel pressure value that will exist at the fuel injection timing. The fuel injection valve operating section is configured to open the fuel injection valve at the prescribed fuel injection timing to discharge a quantity of fuel equal to the corrected fuel injection quantity.

With the present invention, the fuel injection quantity is not corrected based on the fuel pressure measured at the prescribed calculation time occurring before the fuel injection timing. Instead, the fuel pressure expected to act on the fuel injection valve at the fuel injection timing is estimated at a timing preceding the fuel injection timing and the fuel injection quantity is corrected based on the estimated fuel pressure value. As a result, the fuel injection quantity can be corrected in accordance with the actual fuel pressure that will exist at the fuel injection timing, thereby improving the accuracy with which the fuel injection quantity is corrected based on the fuel pressure and preventing a fuel injection quantity that is too large from being delivered.

As mentioned above, the present invention can also be applied to an engine equipped a pump drive cam driven by a crankshaft, a high pressure fuel pump that has a pump plunger driven by the pump drive cam and is configured and arranged to discharge high-pressure fuel during a rising stroke of the pump plunger and to maintain a prescribed fuel pressure during a falling stroke of the pump plunger, and a fuel injection valve configured and arranged to open at a prescribed fuel injection timing and deliver high-pressure fuel from the high pressure fuel pump into a combustion chamber of the engine. In this case, the fuel pressure estimate value calculating section is further configured to set the prescribed calculation time for the calculating of the estimated fuel pressure value to occur before the prescribed fuel injection timing that occurs during a rising stroke of a pump plunger that drives the high pressure fuel pump to discharge the high-pressure fuel during the rising stroke of the pump plunger and to maintain a prescribed fuel pressure during a falling stroke of the pump plunger.

In the embodiments described heretofore, the estimate value $\Delta P$ of the amount by which the fuel pressure rises during the period spanning from the injection start timing calculation timing to the fuel injection timing is calculated based on the lift amount of the pump plunger 14b and the size of the crankshaft angle (ANGTM) between the injection start timing calculation timing and the fuel injection timing. However, it is also acceptable to use the cam profile of the pump drive cam 12 instead of the lift amount of the pump plunger 14b in the calculation.

Although in the embodiments described heretofore the injection end timing is fixed and the injection start timing is calculated, it is also possible to apply the present invention in cases where the injection start timing is fixed and the injection end timing is calculated.

Although in the embodiments described heretofore the Ref signal issuance timing is used as the injection start timing calculation timing, it is also acceptable to use the Ref signal termination timing as the injection start timing calculation timing. It is also possible to use a timing that is not based on the Ref signal. In short, the present invention can be applied so long as a timing for calculating the injection start timing (or injection end timing) is provided at a timing that occurs temporally prior to the fuel injection timing.

Although in the embodiments described heretofore a pump drive cam 12 is provided on an intake valve camshaft and the high pressure fuel pump is driven by the pump drive cam 12, the present invention is not limited to such an arrangement. For example, it is acceptable to use an inline pump for the high pressure fuel pump or to provide the pump drive cam 12 on the exhaust valve camshaft. It is also possible to provide the pump drive cam on a shaft other than a camshaft.

Although in the embodiments described heretofore the fuel injection valves are arranged to inject directly into the combustion chambers of the respective cylinders, the present invention can also be applied in situations where the fuel injection valves are arranged to inject into the intake ports. Furthermore, the invention is not limited to engines provided with a common rail.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine fuel control system comprising:
   a high pressure fuel pump arranged to discharge high pressure fuel;
   at least one fuel injection valve configured and arranged to open at a prescribed fuel injection timing and inject the high pressure fuel from the high pressure fuel pump to a cylinder of an engine; and
   a controller operatively coupled to the fuel injection valve, the controller including
   a fuel injection quantity calculating section configured to calculate a fuel injection quantity for the cylinder based on at least one operating condition of the engine;
   a fuel pressure estimate value calculating section configured to execute a calculation at a prescribed calculation time occurring before the prescribed fuel injection timing with the calculation estimating an estimated fuel pressure value of the high pressure fuel that will be acting on the fuel injection valve at the prescribed fuel injection timing, the estimated fuel pressure value being obtained based on an actual fuel pressure acting on the fuel injection valve at the prescribed calculation time and a compensation value indicating an estimated amount by which the fuel pressure will change during a period from the prescribed calculation time until the prescribed fuel injection timing;
   a fuel injection quantity correcting section configured to correct the fuel injection quantity that was previously calculated to a corrected fuel injection quantity based on the estimated fuel pressure value that will exist at the fuel injection timing; and
   a fuel injection valve operating section configured to open the fuel injection valve at the prescribed fuel injection timing to discharge a quantity of fuel equal to the corrected fuel injection quantity.

2. The engine fuel control system according to claim 1, wherein
   the fuel pressure estimate value calculating section is further configured to set the prescribed calculation time for the calculating of the estimated fuel pressure value to occur before the prescribed fuel injection timing that occurs during a rising stroke of a pump plunger that drives the high pressure fuel pump to discharge the high pressure fuel during the rising stroke of the pump plunger and to maintain a prescribed fuel pressure during a falling stroke of the pump plunger.

3. The engine fuel control system as recited in claim 2, wherein
the fuel injection quantity correcting section is further configured to set the corrected fuel injection quantity with respect to a fuel injection valve for each cylinder of the engine, and
the fuel injection valve operating section is further configured to open the fuel injection valve for each of the cylinders at the prescribed fuel injection timing.

4. The engine fuel control system as recited in claim 2, wherein
the fuel pressure estimate value calculating section is further configured to obtain the estimated fuel pressure value that will exist at the prescribed fuel injection timing by adding the actual fuel pressure acting on the fuel injection valve at the prescribed calculation time to the compensation value based on the estimated amount by which the fuel pressure will increase during the period from the prescribed calculation time until the prescribed fuel injection timing.

5. An engine fuel control system comprising:
a high pressure fuel pump arranged to discharge high pressure fuel;
at least one fuel injection valve configured and arranged to open at a prescribed fuel injection timing and inject the high pressure fuel from the high pressure fuel pump; and
a controller operatively coupled to the fuel injection valve, the controller including
a fuel injection quantity calculating section configured to calculate a fuel injection quantity based on at least one operating condition of the engine;
a fuel pressure estimate value calculating section configured to execute a calculation at a prescribed calculation time occurring before the prescribed fuel injection timing with the calculation estimating an estimated fuel pressure value of the high pressure fuel that will be acting on the fuel injection valve;
a fuel injection quantity correcting section configured to correct the fuel injection quantity that was previously calculated to a corrected fuel injection quantity based on the estimated fuel pressure value that will exist at the fuel injection timing; and
a fuel injection valve operating section configured to open the fuel injection valve at the prescribed fuel injection timing to discharge a quantity of fuel equal to the corrected fuel injection quantity,
the fuel pressure estimate value calculating section being further configured to set the prescribed calculation time for the calculating of the estimated fuel pressure value to occur before the prescribed fuel injection timing that occurs during a rising stroke of a pump plunger that drives the high pressure fuel pump to discharge the high pressure fuel during the rising stroke of the pump plunger and to maintain a prescribed fuel pressure during a falling stroke of the pump plunger, the fuel pressure estimate value calculating section being further configured to obtain the estimated fuel pressure value that will exist at the prescribed fuel injection timing by adding an actual fuel pressure acting on the fuel injection valve at the prescribed calculation time to a compensation value based on an estimated amount by which the fuel pressure will increase during a period from the prescribed calculation time until the prescribed fuel injection timing, and the fuel pressure estimate value calculating section being further configured to estimate the compensation value of the estimated amount by which the fuel pressure will increase during the period from the prescribed calculation time until the prescribed fuel injection timing based on a crankshaft angle position existing between the prescribed calculation time and the prescribed fuel injection timing and one of a cam profile of a pump drive cam and a plunger lift of the pump plunger.

6. The engine fuel control system as recited in claim 5, wherein
the fuel pressure estimate value calculating section is further configured to correct the compensation value of the estimated amount by which the fuel pressure will increase during the period from the prescribed calculation time until the prescribed fuel injection timing based on a fuel temperature.

7. The engine fuel control system as recited in claim 2, wherein
the fuel injection valve operating section is further configured to set an adjusted fuel injection timing for opening of the fuel injection valve based on comparing the estimated fuel pressure value that will exist at the prescribed fuel injection timing with a prescribed injection permission fuel pressure such that the fuel injection valve is opened during a compression stroke of the engine if the estimated fuel pressure value that will exist at the prescribed fuel injection timing is larger than the prescribed injection permission fuel pressure, and the fuel injection valve is opened during the intake stroke of the engine if the estimated fuel pressure value that will exist at the prescribed fuel injection timing is smaller tan the prescribed injection permission fuel pressure.

8. The engine fuel control system as recited in claim 1, further comprising
a crankshaft; and
an actuator driven by the crankshaft, with the high pressure fuel pump driven by the actuator.

9. The engine fuel control system as recited in claim 1, further comprising
a crankshaft; and
a pump drive cam driven by the crankshaft, with the high pressure fuel pump including a pump plunger driven by the pump drive cam to discharge the high pressure fuel during a rising stroke of the pump plunger and to maintain a prescribed fuel pressure during a falling stroke of the pump plunger.

10. The engine fuel control system as recited in claim 9, wherein
the fuel pressure estimate value calculating section is further configured to set the prescribed calculation time for the calculating of the estimated fuel pressure value to occur before the prescribed fuel injection timing that occurs during the rising stroke of the pump plunger.

11. An engine fuel control system comprising:
a fuel injection quantity calculating section configured to calculate a fuel injection quantity based on at least one operating condition of an engine equipped with a high pressure fuel pump to supply high pressure fuel to at least one fuel injection valve that opens at a prescribed fuel injection timing to deliver the high pressure fuel from the high pressure fuel pump to a cylinder of the engine;

a fuel pressure estimate value calculating section configured to execute a calculation at a prescribed calculation time occurring before the prescribed fuel injection timing of the cylinder that occurs during a rising stroke of a pump plunger with the calculation estimating an estimated fuel pressure value of the high pressure fuel that will be acting on the fuel injection valve at the prescribed fuel injection timing, the estimated fuel pressure value being obtained based on an actual fuel pressure acting on the fuel injection valve at the prescribed calculation time and a compensation value indicating an estimated amount by which the fuel pressure will change during a period from the prescribed calculation time until the prescribed fuel injection timing;

a fuel injection quantity correcting section configured to correct the fuel injection quantity that was previously calculated based on the estimated fuel pressure value that will exist at the fuel injection timing to a corrected fuel injection quantity; and a fuel injection valve operating section configured to open the fuel injection valve at the prescribed fuel injection timing to discharge a quantity of fuel equal to the corrected fuel injection quantity.

12. The engine fuel control system according to claim 11, wherein
the fuel pressure estimate value calculating section is further configured to set the prescribed calculation time for the calculating of the estimated fuel pressure value to occur before the prescribed fuel injection timing that occurs during a rising stroke of a pump plunger that drives the high pressure fuel pump to discharge the high pressure fuel during the rising stroke of the pump plunger and to maintain a prescribed fuel pressure during a falling stroke of the pump plunger.

13. The engine fuel control system as recited in claim 11, wherein
the fuel injection quantity correcting section is further configured to set the corrected fuel injection quantity with respect to a fuel injection valve for each cylinder of the engine, and
the fuel injection valve operating section is further configured to open the fuel injection valve for each of the cylinders at the prescribed fuel injection timing.

14. The engine fuel control system as recited in claim 11, wherein
the fuel pressure estimate value calculating section is further configured to obtain the estimated fuel pressure value that will exist at the prescribed fuel injection timing by adding the actual fuel pressure acting on the fuel injection valve at the prescribed calculation time to the compensation value based on the estimated amount by which the fuel pressure will increase during the period from the prescribed calculation time until the prescribed fuel injection timing.

15. An engine fuel control system comprising:
a fuel injection quantity calculating section configured to calculate a fuel injection quantity based on at least one operating condition of an engine equipped with a high pressure fuel pump to supply high pressure fuel to at least one fuel injection valve that opens at a prescribed fuel injection timing to deliver the high pressure fuel from the high pressure fuel pump to the engine;
a fuel pressure estimate value calculating section configured to execute a calculation at a prescribed calculation time occurring before the prescribed fuel injection timing of a cylinder that occurs during a rising stroke of a pump plunger with the calculation estimating an estimated fuel pressure value of the high pressure fuel that will be acting on the fuel injection valve:

a fuel injection quantity correcting section configured to correct the fuel injection quantity that was previously calculated based on the estimated fuel pressure value that will exist at the fuel injection timing to a corrected fuel injection quantity; and a fuel injection valve operating section configured to open the fuel injection valve at the prescribed fuel injection timing to discharge a quantity of fuel equal to the corrected fuel injection quantity, the fuel pressure estimate value calculating section being further configured to obtain the estimated fuel pressure value that will exist at the prescribed fuel injection timing by adding an actual fuel pressure acting on the fuel injection valve at the prescribed calculation time to a compensation value based on an estimated amount by which the fuel pressure will increase during a period from the prescribed calculation time until the prescribed fuel injection timing, and the fuel pressure estimate value calculating section being further configured to estimate the compensation value of the estimated amount by which the fuel pressure will increase during the period from the prescribed calculation time until the prescribed fuel injection timing based on a crankshaft angle position existing between the prescribed calculation time and the prescribed fuel injection timing and one of a cam profile of a pump drive cam and a plunger lift of the pump plunger.

16. The engine fuel control system as recited in claim 15, wherein
the fuel pressure estimate value calculating section is further configured to correct the compensation value of the estimated amount by which the fuel pressure will increase during the period from the prescribed calculation time until the prescribed fuel injection timing based on a fuel temperature.

17. The engine fuel control system as recited in claim 11, wherein
the fuel injection valve operating section is further configured to set an adjusted fuel injection timing for opening of the fuel injection valve based on comparing the estimated fuel pressure value that will exist at the prescribed fuel injection timing with a prescribed injection permission fuel pressure such that the fuel injection valve is opened during a compression stroke of the engine if the estimated fuel pressure value that will exist at the prescribed fuel injection timing is larger than the prescribed injection permission fuel pressure, and the fuel injection valve is opened during the intake stroke of the engine if the estimated fuel pressure value that will exist at the prescribed fuel injection timing is smaller than the prescribed injection permission fuel pressure.

18. The engine fuel control system as recited in claim 11, further comprising
a crankshaft; and
a pump drive cam driven by the crankshaft, with the high pressure fuel pump including a pump plunger driven by the pump drive cam to discharge the high pressure fuel during a rising stroke of the pump plunger and to maintain a prescribed fuel pressure during a falling stroke of the pump plunger.

19. An engine fuel control system comprising:
fuel injection quantity determining means for calculating a fuel injection quantity for a cylinder of an engine based on at least one operating condition of the engine equipped a high pressure fuel pump to supply high pressure fuel to at least one fuel injection valve that opens at a prescribed fuel injection timing to deliver the high pressure fuel from the high pressure fuel pump to the cylinder of the engine;

estimated fuel pressure value determining means for calculating an estimated fuel pressure value of the high pressure fuel that will be acting on the fuel injection valve when the prescribed fuel injection timing is reached at a prescribed calculation time occurring before the prescribed fuel injection timing, the estimated fuel pressure value being obtained based on an actual fuel pressure acting on the fuel injection valve at the prescribed calculation time and a compensation value indicating an estimated amount by which the fuel pressure will change during a period from the prescribed calculation time until the prescribed fuel injection timing;

fuel injection quantity correcting means for correcting the fuel injection quantity that was previously calculated to a corrected fuel injection quantity based on the estimated fuel pressure value that will exist at the fuel injection timing; and fuel injection valve operating means for opening the fuel injection valve at the prescribed fuel injection timing to discharge a quantity of fuel equal to the corrected fuel injection quantity.

20. An engine fuel delivery method comprising:

calculating a fuel injection quantity for a cylinder of an engine based on at least one operating condition of the engine equipped with a high pressure fuel pump to supply high pressure fuel to at least one fuel injection valve that opens at a prescribed fuel injection timing to deliver the high pressure fuel from the high pressure fuel pump to the cylinder of the engine;

calculating an estimated fuel pressure value of the high pressure fuel at a prescribed calculation time occurring before the prescribed fuel injection timing that is indicative of an actual fuel pressure that will be acting on the fuel injection valve at the prescribed fuel injection timing, the estimated fuel pressure value being obtained based on an actual fuel pressure acting on the fuel injection valve at the prescribed calculation time and a compensation value indicating an estimated amount by which the fuel pressure will change during a period from the prescribed calculation time until the prescribed fuel injection timing;

correcting the fuel injection quantity that was previously calculated to a corrected fuel injection quantity based on the estimated fuel pressure value that will exist at the fuel injection timing; and opening the fuel injection valve at the prescribed fuel injection timing to discharge a quantity of fuel equal to the corrected fuel injection quantity.

21. The engine fuel control system as recited in claim 5, wherein the fuel pressure estimate value calculating section is configured to derive the crankshaft angle position based on an amount by which a valve timing control section has controlled open and close timings of the fuel injection valve.

22. The engine fuel control system as recited in claim 15, wherein the fuel pressure estimate value calculating section is configured to derive the crankshaft angle position based on an amount by which a valve timing control section has controlled open and close timings of the fuel injection valve.

* * * * *